United States Patent [19]
Yie

[11] Patent Number: 5,799,688
[45] Date of Patent: Sep. 1, 1998

[54] AUTOMATIC FLOW CONTROL VALVE

[75] Inventor: Gene G. Yie, Auburn, Wash.

[73] Assignee: Jetec Company, Auburn, Wash.

[21] Appl. No.: 421,401

[22] Filed: Apr. 13, 1995

Related U.S. Application Data

[63] Continuation-in-part of Ser. No. 219,801, Mar. 29, 1994, Pat. No. 5,524,821, which is a continuation-in-part of Ser. No. 22,123, Feb. 25, 1993, Pat. No. 5,297,777, which is a continuation-in-part of Ser. No. 871,895, Apr. 21, 1992, Pat. No. 5,241,986, which is a continuation-in-part of Ser. No. 794,581, Nov. 19, 1991, Pat. No. 5,186,393, which is a continuation-in-part of Ser. No. 630,560, Dec. 20, 1990, Pat. No. 5,092,362, and a continuation-in-part of Ser. No. 891,568, May 29, 1992, abandoned, which is a continuation-in-part of Ser. No. 701,534, May 16, 1991, Pat. No. 5,117,872.

[51] Int. Cl.$^6$ ................................. F16K 31/363
[52] U.S. Cl. .................. 137/505.13; 137/505.14; 137/505.18; 137/614.2; 251/324
[58] Field of Search ................. 137/505.13, 505.14, 137/505.15, 505.18, 474, 469, 614.2; 251/324

[56] References Cited

U.S. PATENT DOCUMENTS

| | | | |
|---|---|---|---|
| 492,100 | 2/1893 | Ord | 251/28 |
| 1,861,916 | 6/1932 | Hennebohle | 251/322 X |
| 2,055,576 | 9/1936 | Hollerith | 251/44 X |
| 2,219,290 | 10/1940 | Bijur | 137/543.23 |
| 2,485,504 | 10/1949 | Morgan | 251/324 |
| 2,822,817 | 2/1958 | Benzel | 137/543.23 X |
| 2,892,644 | 6/1959 | Collins | 251/324 X |
| 2,992,817 | 7/1961 | Templeton | 251/324 X |
| 3,199,540 | 8/1965 | Forster | 251/324 X |
| 3,211,164 | 10/1965 | Bender et al. | 251/324 X |
| 3,234,959 | 2/1966 | Feinberg | 137/543.23 X |
| 3,260,499 | 7/1966 | Roemer | 251/214 |
| 3,394,890 | 7/1968 | Heinrich et al. | 239/526 |
| 3,439,705 | 4/1969 | Simko | 137/543.23 |
| 3,469,853 | 9/1969 | Gullick | 277/112 |
| 3,537,653 | 11/1970 | Jones | 239/533.15 |
| 3,561,680 | 2/1971 | Ott | 239/411 |
| 3,565,100 | 2/1971 | Pfleger | 137/543.23 |

(List continued on next page.)

OTHER PUBLICATIONS

One page advertisement from Hydro Manufacturing & Sales, P.O. Box 308, Missouri City, Texas 77459, date unknown.

Applicant's three sketches describing hand-operated waterjet lance sold by Applicant on Jul. 7, 1989.

*Primary Examiner*—John Rivell
*Attorney, Agent, or Firm*—Speckman, Pauley & Fejer

[57] ABSTRACT

A pressure valve having a fluid inlet, a first chamber, a throughbore, a second chamber, a fluid outlet and a valve stem. The valve stem is mounted within a valve body and has several different diameters. A pressure condition within one or more of the chambers acts upon the valve stem to urge the stem into either an open position or a closed position, depending upon the design of the valve. The valve is particularly suitable for bypass valves, pressure regulating valves, over-pressure protection valves, lost-pressure protection valves, and other pressure-sensitive valve applications.

16 Claims, 25 Drawing Sheets

U.S. PATENT DOCUMENTS

| | | | |
|---|---|---|---|
| 3,576,194 | 4/1971 | Christensen | 251/324 X |
| 3,672,575 | 6/1972 | Hinrichs | 239/445 |
| 3,709,507 | 1/1973 | Underwood | 251/324 X |
| 3,722,646 | 3/1973 | Oguma | 137/505.14 X |
| 3,765,607 | 10/1973 | Pacht | 239/124 |
| 3,788,347 | 1/1974 | Guth | 137/355.17 |
| 3,802,628 | 4/1974 | Goss et al. | 239/302 |
| 3,885,739 | 5/1975 | Tuttle | 239/124 |
| 3,943,969 | 3/1976 | Rubin et al. | 137/543.23 X |
| 3,986,523 | 10/1976 | Pacht | 137/882 |
| 4,005,733 | 2/1977 | Riddel | 137/625.4 |
| 4,009,860 | 3/1977 | Lingnau | 251/44 |
| 4,024,884 | 5/1977 | Prescott et al. | 251/44 X |
| 4,095,774 | 6/1978 | Garnett et al. | 251/44 |
| 4,162,763 | 7/1979 | Higgins | 239/583 |
| 4,176,680 | 12/1979 | DeLaunay | 137/538 X |
| 4,216,907 | 8/1980 | Fuller | 239/127 |
| 4,313,570 | 2/1982 | Olsen | 239/583 |
| 4,349,154 | 9/1982 | Pacht | 239/124 |
| 4,371,001 | 2/1983 | Olsen | 137/512.3 |
| 4,406,383 | 9/1983 | Duncan | 251/44 X |
| 4,412,792 | 11/1983 | LaBorde et al. | 137/512.3 X |
| 4,478,368 | 10/1984 | Yie | 239/430 |
| 4,483,483 | 11/1984 | Grime | 251/324 X |
| 4,555,872 | 12/1985 | Yie | 51/439 |
| 4,640,305 | 2/1987 | Johnson | 251/214 X |
| 4,640,309 | 2/1987 | Hoffman et al. | 137/596.18 |
| 4,665,944 | 5/1987 | Wallace et al. | 239/124 X |
| 4,666,083 | 5/1987 | Yie | 239/8 |
| 4,699,351 | 10/1987 | Wells | 251/44 X |
| 4,716,924 | 1/1988 | Pacht | 137/543.23 X |
| 4,765,540 | 8/1988 | Yie | 239/8 |
| 4,768,709 | 9/1988 | Yie | 239/8 |
| 4,784,330 | 11/1988 | Hammelmann | 239/526 |
| 4,862,911 | 9/1989 | Yie | 137/512 X |
| 4,953,589 | 9/1990 | Nakamura . | |
| 5,092,362 | 3/1992 | Yie | 137/596.1 |
| 5,103,866 | 4/1992 | Foster | 137/596.15 |
| 5,117,872 | 6/1992 | Yie | 137/882 |
| 5,186,393 | 2/1993 | Yie | 137/509 X |
| 5,234,026 | 8/1993 | Patterson | 137/505.18 |
| 5,241,986 | 9/1993 | Yie | 137/512 |
| 5,297,777 | 3/1994 | Yie | 251/214 |

   
FIG.4e　　FIG.4f　　FIG.4g　　Fig.4h
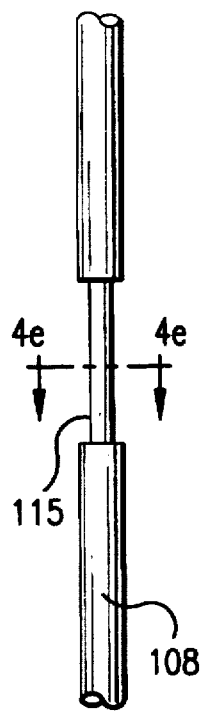 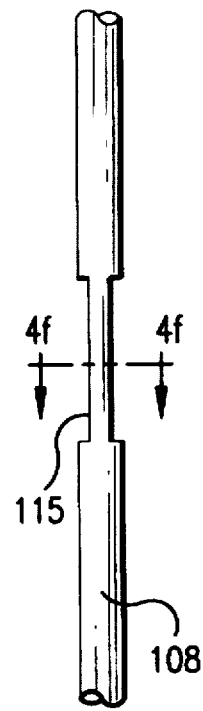 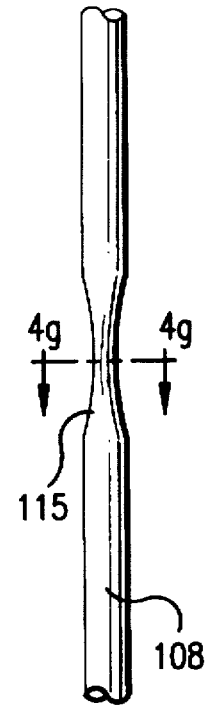 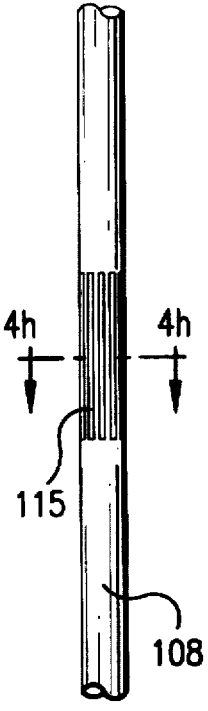
FIG.4a　　FIG.4b　　FIG.4c　　Fig.4d

AUTOMATIC FLOW CONTROL VALVE

CROSS REFERENCE TO RELATED APPLICATIONS

This application is a continuation-in-part of U.S. patent application having Ser. No. 08/219,801, filed Mar. 29, 1994 now U.S. Pat. No. 5,524,821, which is a continuation-in-part of Ser. No. 08/022,123, filed Feb. 25, 1993, now U.S. Pat. No. 5,297,777, which is a continuation-in-part of Ser. No. 07/871,895, filed Apr. 21, 1992, now U.S. Pat. No. 5,241,986, which is a continuation-in-part of Ser. No. 07/794,581, filed Nov. 19, 1991, now U.S. Pat. No. 5,186,393, which is a continuation-in-part of Ser. No. 07/630,560, filed Dec. 20, 1990, now U.S. Pat. No. 5,092,362; and a continuation-in-part of Ser. No. 07/891,568, filed May 29, 1992, now abandoned, which is a continuation-in-part of Ser. No. 07/701,534, filed May 16, 1991, now U.S. Pat. No. 5,117,872.

FIELD OF THE INVENTION

This invention relates to a fluid control valve design that allows a basic valve to accomplish various valving tasks at a wide range of fluid pressures and flow rates, and that can be used with many different fluids. The valve design of this invention achieves automatic operation without an external power supply. This invention also relates to a method and apparatus for discharging a high-pressure waterjet into the ground or into another suitable structure. The waterjet passes through a nozzle and generates a vacuum which is capable of drawing dry or wet additives into the waterjet stream.

BACKGROUND OF THE INVENTION

It is often necessary to control pressure and/or flow of liquid, gas, slurry, or multiple-phase system fluids in industrial fluid systems. Various types of valves are used to achieve such control. Such valves may be quite simple or quite complex, and in many instances, it is desirable that such valves are automatic and do not require an external power supply. An optimal automatic control valve is capable of sensing a change in a fluid parameter, such as fluid pressure and/or flow rate, and uses stored energy to respond to such change. A compression spring, stored compressed gas, or system fluid can provide such stored energy. The most common automatic valves use a spring, and are basically instant on-off valves. Such valves typically perform one of the following four functions:

1. Bypass or Unloading Valves

A bypass valve is a normally-closed, pressure-rise-to-open type valve commonly used to achieve pressure relief in a fluid system. Such a valve typically uses a compression spring to apply a fixed force to a valve poppet. The valve poppet is subjected to a fluid-induced force in a direction directly opposite to the spring force. The valve poppet closes a bypass valve port when the fluid pressure is at or below a set value. When the fluid pressure inside the valve rises above the set value, a fluid-induced force on the valve poppet becomes greater than the spring force and the bypass valve port opens, and fluid escapes through the port. The escaping fluid reduces the system pressure, and the bypass valve port may either be closed again or remain open, depending upon the reason for the over-pressurization. Such bypass valves are commonly used to maintain a constant pressure in a fluid system downstream of a pump or pressure source and upstream of an on-off tool such as an air-powered drill.

A hand operated on-off valve, as is commonly used at the nozzle of a positive displacement pump such as a crankshaft pump used in high-pressure waterjetting apparatuses, can cause water pressure inside a hose to increase above a set value. When the hand operated on-off valve is closed, the water pressure inside the hose increases. A bypass valve positioned at the pump end of the hose can be used to relieve the water pressure. Water pressure decreases when the hand operated on-off valve opens, and the bypass valve closes. Thus, the pump discharge pressure remains relatively constant. Water escaping through the bypass valve port can be returned to the pump or to a charge tank. Without a bypass valve, the pump discharge pressure can be so irregular that the pump and the prime mover can be damaged.

Such bypass valves can also be used to maintain a constant discharge pressure in other pressurized systems, such as an automobile fuel injection system. In this instance, a bypass valve is positioned downstream of a fuel pump and upstream of a fuel injector, and bypassed gasoline is returned to a fuel tank through a bypass tube.

2. Pressure Regulating Valves

A pressure regulating valve is a normally-closed, pressure-drop-to-open type valve commonly used to maintain a constant pressure downstream from the valve in a fluid system. On-off operations of an inlet fluid achieves pressure regulation of the system fluid flowing through the valves. Such conventional valves do not have bypass ports. An example of a pressure regulating valve is a check valve having an externally adjustable spring force. A change in fluid pressure downstream of such valve interrupts the fluid flow. Thus, the valve prevents the downstream pressure from exceeding the upstream pressure. Air compressors and compressed gas apparatuses commonly use such pressure regulating valves. However, such valves are not typically used in a high-pressure waterjetting apparatus because of the incompressibility of water and the high pressures used in such apparatuses.

3. Over-Pressure Protection Valves

Over-pressure protection valves are normally-open, pressure-increase-to-close type valves and are commonly used to protect a fluid system from damage caused by a sudden increase in system pressure due to valve failure, pressure regulator failure, or other system component failure. Such valves close only when a system fluid pressure exceeds a set value, and reopen when a system fluid pressure downstream from the valve returns to the set value. Such valves are infrequently used because bypass valves are technically simpler to design and construct and can provide the necessary protection against over-pressurization. However, in some situations a bypass valve is unsuitable or undesirable. For example, steel pipelines used to transport and distribute natural gas to customers are often buried under streets and have relatively high internal pressures, such as 20–30 psig. Pressure regulators reduce the pressure to inches of water column before supplying the natural gas to common household appliances such as furnaces, water heaters, ranges, and dryers. Such pressure regulators can fail without warning and send over-pressurized gas to the service piping system inside the home and cause line ruptures and component failures. Thus, a normally-open over-pressure protection valve can be installed downstream of the pressure regulator to prevent such over-pressurized gas from reaching the service piping system. Unfortunately, a suitable over-pressure protection valve for natural gas or propane services is not currently available. A bypass valve may be unsuitable for use in such instances because it is undesirable to vent natural gas to the atmosphere.

4. Lost-Pressure Protection Valves

A lost-pressure protection valve is a normally-open, pressure-drop-to-close type valve. Designing such valves to operate without an external power supply is difficult, and accordingly, such valves are fairly rare. However, a lost-pressure protection valve can be very useful as a reverse check valve for promptly halting fluidic flow when a loss of fluid pressure is detected. A natural gas line rupture is a good example of when such a valve can prevent a hazardous condition. Natural gas service piping inside a home is usually constructed of plastic tubing, copper piping, or small diameter steel piping. Such piping can be damaged by fires, landslides, earthquakes, or structure failures, and the resulting gas leakage can cause fires or explosions. A lost-pressure protection valve can be installed either inside or outside the home and prevent or mitigate damages resulting from such leakage.

A lost-pressure protection valve can also be used in air compressors which typically use rubber hoses to transport compressed fluids from the compressor to equipment. Such hoses can separate from the equipment, while pressurized, and cause death or injury because of the tremendous energy with which they fly through the air. A lost-pressure protection valve can be installed at the compressor end of the hose and thus significantly reduce this danger.

Lost-pressure protection valves can also be installed at the pump end of hoses used in high-pressure waterjetting apparatuses. Flexible hoses used in such apparatuses operate with internal pressures of up to approximately 40,000 psi and beyond, and if separated from the apparatus can become a lethal weapon.

Such valves can be used in many situations in which uncontrolled escape of a system fluid is undesirable. Hazardous material handling, fuel lines in automobiles and aircraft, hydraulic lines in aircraft and critical machinery, and pressurized transport lines used in refineries and chemical plants are all examples of such systems. A lost-pressure protection valve installed in any of these systems can provide significant improvements in safety and conservation of materials.

There are many reasons and opportunities for introducing selected materials into the ground or another soil structure for various purposes. For example, water can be sprayed over a ground surface where plants grow. Such water penetrates into the soil by gravity and capillary action, and the water travels to eventually reach roots of such plants.

Various conventional spray methods and equipment are used in the agricultural industry to water plants. However, spraying and other surface irrigation methods are often unreliable or undesirable for various reasons. For example, in relatively arid regions water is scarce and spraying methods result in wasted water since much water is lost through surface evaporation. It is very desirable to introduce the water directly into the soil, and to retain the water within the soil for an extended time, so that plant roots can consume the water. Water is often injected into the soil along with selected additives to assist plant growth. Such additives can include water-absorbing materials, plant nutrients, insecticides and herbicides. By adjusting the operating conditions, the water and selected additives can be deposited precisely at a predetermined depth which is best suited for the particular plants. A variety of biodegradable materials that can quickly absorb water and retain a large quantity of water, such as by swelling into a gel, are commercially available. It is apparent that there is a need for an efficient method of injecting such water and additives into the ground.

Water and additives are also injected into the soil for assisting plant growth, such as in the maintenance of trees found in urban and city areas. Many trees planted along urban and city streets are in dire need of water due to large amounts of asphalt and cement ground cover which prevents water from reaching tree roots. In such situations, usually only a relatively small area of ground immediately surrounding each tree or plant remains uncovered. Thus, it is often inadequate to simply spray water around each tree or plant and rely upon surface absorption. Also because of the large amounts of asphalt and concrete in such areas, the soil temperature directly below the asphalt or concrete can be quite high. As a result, many trees and other plants in urban and city areas die due to the lack of water. To overcome the lack of water consumption problems associated with surface watering in such areas, it is apparent that water should be injected into the soil in the vicinity of each tree or plant, with or without additives. It is also apparent that there is a need for a method that can be used to inject water into the ground so that urban and city trees or other plants can adequately absorb the water.

Agricultural methods for seeding may also require a method and apparatus for injecting water into the soil. A common method for seeding is to use a simple spray with or without a subsequent cover of soil or other suitable materials. Without cover, plant seeds can be carried away by rain, wind, birds and the like. Seed germination can be drastically improved if the plant seeds are deposited into the soil using an injection method wherein the water, plant nutrients and other additives are deposited together with the seeds, below the ground surface. With such method, the seeds are protected and water is immediately available for initial germination purposes.

Regarding geotechnical technologies, many selected materials are also deposited into the ground for various reasons. For example, soil stabilization chemicals are deposited into the ground in order to fill voids, to increase the bearing strength of the ground, to stop seepage of underground water, or to mitigate soil movement. The soil stabilization materials may be in the form of dry powder, wet slurries or other solutions. One known method for depositing such materials is to trench the ground and fill the trench with material. Another known method for depositing such materials is to bore holes into the ground and subsequently pump the materials into the bored holes. The trenching method is effective but very expensive. The drilling and pump method is less expensive than trenching, but not as effective due to a lack of necessary forces for pushing the materials into the ground. With the drilling and pump method, the selected materials can be effectively deposited into the ground if greater forces are available for driving the materials. Thus, there is also an obvious need for an injection method that can be advantageously used in soil stabilization operations.

One current concern regarding environmental protection is remediation of polluted ground and water. In some cases, polluted water and soil must be removed. In other cases, the polluted sites can be treated by bioremediation processes in which selected microbes are introduced to convert harmful pollutants into harmless substances. Such microbes are basically selected bacteria and are typically in the form of a dry powder carrier material, such as ash, clay, pumice or diatomite, and typically contain a relatively small amount of nutrient to sustain the life of the selected bacteria. In order to apply such microbes, the powder, slurry or solution is sprayed over the polluted site. It is obvious that such practice is quite troublesome since spraying the powder creates dust and wastes the material. In many instances, the microbes must penetrate into the subsurface to accomplish a thorough result. In other cases, the microbes must be delivered a great distance so that a large area can be covered. In such applications, the microbes could be delivered advantageously using an injection method. Thus, it is apparent that there is a need for a fluid jet injection method which is well-suited for applying microbes in bioremediation applications.

In firefighting and fire extinguishing activities of houses and buildings, water must be delivered directly to a burning substance or other source of combustion, which is often outside of a firefighter's line of water spray. To extinguish the fire, firefighters must first establish a direct path by using axes or other mechanical equipment to clear the obstacles. Such activities can endanger the firefighter's life and should be avoided, if possible. Hidden fires can be reached with water and fire-retardant materials if the water is in the form of a high-power jet that forms a sufficient force capable of punching a hole through ordinary windows, doors, roofs, walls and other building structures, in order to reach the source of the fire and to quench and suffocate the fire. Thus, there is an apparent need for a fluid jet injection method that is well-suited for extinguishing fires.

DESCRIPTION OF PRIOR ART

A conventional bypass valve is shown in FIG. 15. The valve has a common design that is shared among many industrial bypass and pressure relief valves, and is used in a wide range of pressures. The valve has one or more fluid ports and a bypass port. A spring-loaded plunger that senses changes in fluid pressure inside a valve cavity controls the bypass port. A threaded nut is commonly used to compress the spring which abuts the valve plunger. To set the valve, a desired spring force is applied to the plunger to close the bypass port under the desired system fluid pressure. The valve plunger is exposed to the pressurized fluid and is subjected to a fluid-induced pushing force at the end of the plunger, opposite the spring.

FIG. 16 shows an enlarged view of the plunger of FIG. 15, in a closed position. In a closed position the fluid-induced force ($F_F$) on the valve plunger is $F_F=P_F(A_{plunger}-A_{port})$, where $P_F$=fluid pressure, $A_{plunger}$=cross-sectional area of the plunger at the seal assembly position of the valve as shown in FIG. 15, and $A_{port}$=cross-sectional area of the bypass port closed by the plunger. When the valve is set at the fluid pressure $P_F$, the bypass port is closed and the spring force $F_S$ is equal to or just greater than the fluid-induced force $F_F$. When the fluid pressure $P_F$ increases, fluid-induced force $F_F$ becomes greater than spring force $F_S$ and the valve plunger rises. Fluid-induced force $F_F$ provides even greater lifting force as the end of the valve plunger is exposed to the fluid. In this position, fluid can escape through the valve port, which causes fluid pressure $P_F$ to drop, and the plunger closes the bypass port. The bypass port can be expected to repeatedly open and close during normal valve functioning.

Such a valve is unsuitable for use with very high fluid pressures, and has other shortcomings as well. An extremely high spring force is required at high fluid pressures even when a very small diameter plunger is used. Such a small diameter plunger can be fragile and can fail due to repeated bending and impacting stresses. For example, if the fluid pressure is 40,000 psi, the valve plunger is 0.125 inches in diameter, and the bypass port is 0.063 inches in diameter, the fluid-lifting force on the closed valve plunger is about 366 $lb_f$, which is much too high even for heavy-duty die springs. When the plunger lifts to open the bypass port, the fluid-induced force on the valve plunger increases to 490 $lb_f$. A 0.125 inch diameter valve plunger subjected to constant bending stresses of 366 $lb_f$ or greater is not a favorable condition, early failure of the valve plunger is certain, and dangerous conditions can follow. Further, repetitive pounding of the valve plunger against the bypass port can cause the components to fail relatively early. Leakage can occur and a greater spring force will be required to close the bypass port, thus compounding the problem. Because of the magnitude of forces involved in this type of valve at very high pressures, the diameter of the bypass port should be reasonably smaller than the diameter of the valve plunger. As a result, such valves have a limited flow capability. Accordingly, it is not safe to use a valve similar to that shown in FIGS. 15 and 16 in waterjetting operations above 10,000 psi of pressure.

FIGS. 17 and 18 show a conventional automatic excess-flow protection valve commonly used in conjunction with air compressors. FIG. 17 shows the valve in a normal- open operating position. FIG. 18 shows the valve in a closed position due to excessive flow of fluid through the valve. The valve is fairly simple, and includes only three internal parts: a collar; a spring; and a floating valve poppet. Fluid flows through and around the floating valve poppet in the normal-open position of the valve. Fluid-induced drag causes the floating poppet to bottom-out and to close the valve port when excess fluid flow occurs. It is apparent that valves of this type must be carefully sized to function properly. A shortcoming of the valve is its simplicity. The valve cannot distinguish excess flow due to an upstream loss of pressure control from excess flow due to a downstream line rupture. Such valves malfunction easily and in a shutoff position are not fluid tight. The valve shown in FIGS. 17 and 18 is unfit for waterjetting applications. A lack of precision and reliability also renders such valves unfit for natural gas applications.

SUMMARY OF THE INVENTION

It is one object of this invention to provide bypass valves, pressure regulating valves, over-pressure protection valves, and lost-pressure protection valves that can be used in relatively high-pressure applications, such as waterjetting apparatuses.

It is another object of this invention to provide over-pressure protection valves and lost-pressure protection valves that eliminate uncontrolled release of natural gas from natural gas distribution systems.

It is yet another object of this invention to provide automatic shutoff and reset valves for isolating pressurized hazardous material piping systems.

It is still another object of this invention to provide a valve design that can be used to construct any type of relatively high-pressure valve.

It is another object of this invention to provide a flexible valve design wherein a single valve body can include several valves that are in fluid communication with each other, and which provide an integral valve that achieves both lost-pressure protection and over-pressure protection.

It is yet another object of this invention to provide a valve that is suitable for use at almost any pressure, from extremely low pressures to extremely high pressures.

It is another object of this invention to provide a method and apparatus for injecting selected materials, such as liquids or powders, into the ground.

It is another object of this invention to provide a method and apparatus for generating a pulsed waterjet or other fluid jet which creates suction or a vacuum within a suitable injection nozzle so that selected materials can be introduced into the waterjet stream and thereby injected into the ground.

These and other objects of this invention are achieved with a valve body having a fluid inlet, a first chamber, a throughbore, a second chamber and a fluid outlet. A valve stem is preferably slidably mounted within the valve body. The valve stem has various diameters, and a fluidic pressure inside one or more of the chambers acts upon the valve stem. Depending upon the design of the valve stem, the fluidic pressure within a chamber can urge the valve stem in either an open or a closed position.

According to one preferred embodiment of this invention, the valve stem has a fluid passage which is in fluid communication with the first chamber and the second chamber when the valve stem is in an open position. The valve body preferably slidably supports the valve stem at two areas of the valve stem.

According to one preferred embodiment of this invention, a push rod urges the valve stem in either an open position or a closed position. One end of the push rod can abut the valve stem, and another end of the push rod can abut a spring. The push rod can preferably be adjusted to vary the urging force that the push rod imparts on the valve stem. According to one preferred embodiment of this invention, the spring contacts a plug that is adjustably mounted with respect to the valve body.

According to another preferred embodiment of this invention, a force supplements the opening of the valve or the closing of the valve so the valve operates effectively even in very low pressure and in very high pressure conditions. The supplemental force preferably counteracts the urging force of the push rod, so that the valve opens and closes decisively. The supplemental force can include a rod slidably mounted with respect to the valve body. One end of the rod preferably contacts the valve stem, and the other end of the rod contacts an actuator. The actuator urges the rod against the valve stem in either an open position or a closed position, depending on the design of the valve. The actuator can include a piston that is slidably and sealably mounted within a cylinder. The cylinder can be in communication with a fluid pressure, such as a fluid inlet or a fluid outlet, for driving the piston against the rod.

BRIEF DESCRIPTION OF DRAWINGS

The above-mentioned and other features and objects of this invention will be better understood from the following detailed description taken in conjunction with the drawings wherein:

FIGS. 4a–4d each show a side view of a different embodiment of a valve stem, according to this invention;

FIGS. 4e–4h show views taken along lines 4e—4e through 4h—4h, respectively, as shown in FIGS. 4a–4d;

FIG. 9A is a bottom view of a valve adapter of the instant on-off valve shown in FIG. 9;

DESCRIPTION OF PREFERRED EMBODIMENTS

FIGS. 1 through FIG. 9 show a flow control valve for instant on-off operations with gases or liquids at relatively high pressures, such as pressures between 10,000 psi and 100,000 psi. The valve includes a valve body having two or more valve cavities in communication with each other and defined by two end seal assemblies and one or more valve port seal assemblies. An elongated, round, sliding valve stem is centrally located through the seal assemblies. End plugs are used to support the end seal assemblies. The valve stem has fluid passages which are preferably machined at a mid-section of the valve stem. The valve stem is slid parallel to its longitudinal axis to allow or prevent communication between the valve cavities by way of the fluid passage of the valve stem. Two opposite ends of the valve stem are either not exposed to the working fluid or are exposed to different pressures of the working fluid. With both opposite ends of the valve stem not being exposed to the working fluid, fluid-induced forces of relatively high magnitude are not exerted on the valve stem. Such instant on-off valve is taught by U.S. Pat. No. 5,297,777, and the teachings of such patent are incorporated into this specification by reference.

Figure 1:
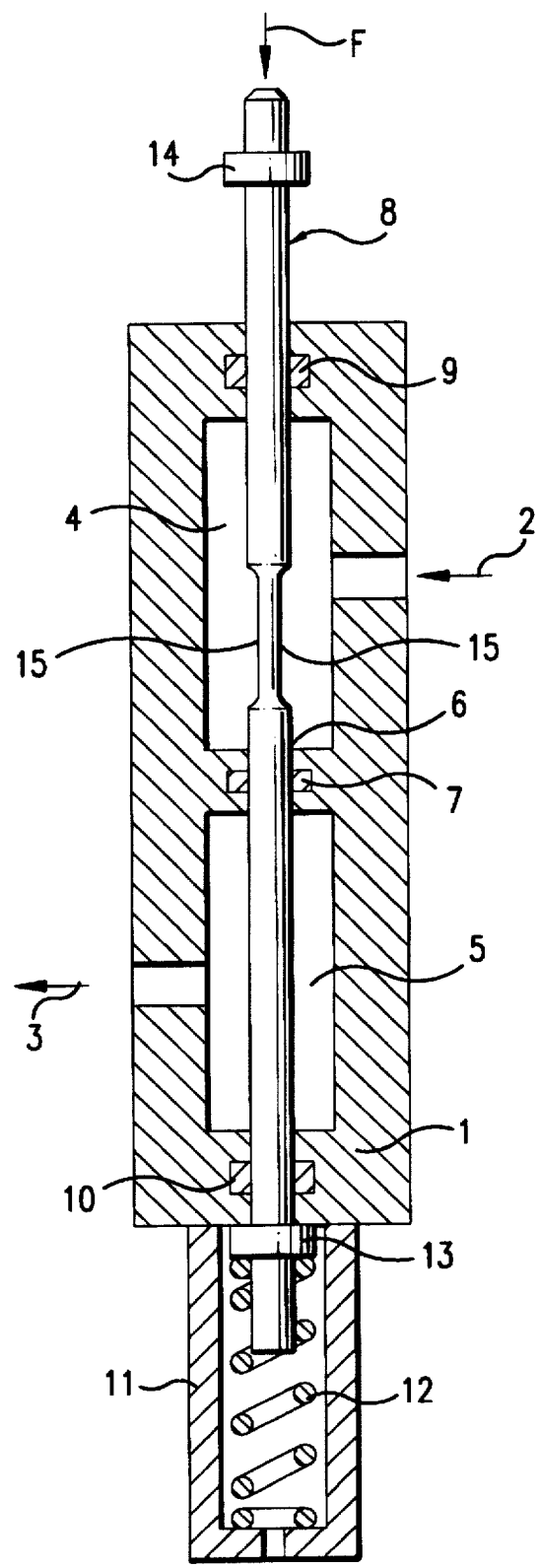
FIG. 1 is a simplified cross-sectional side view taken along a longitudinal axis of an instant on-off valve, according to one preferred embodiment of this invention, showing primary components with the valve in a closed position.
Figure 2:
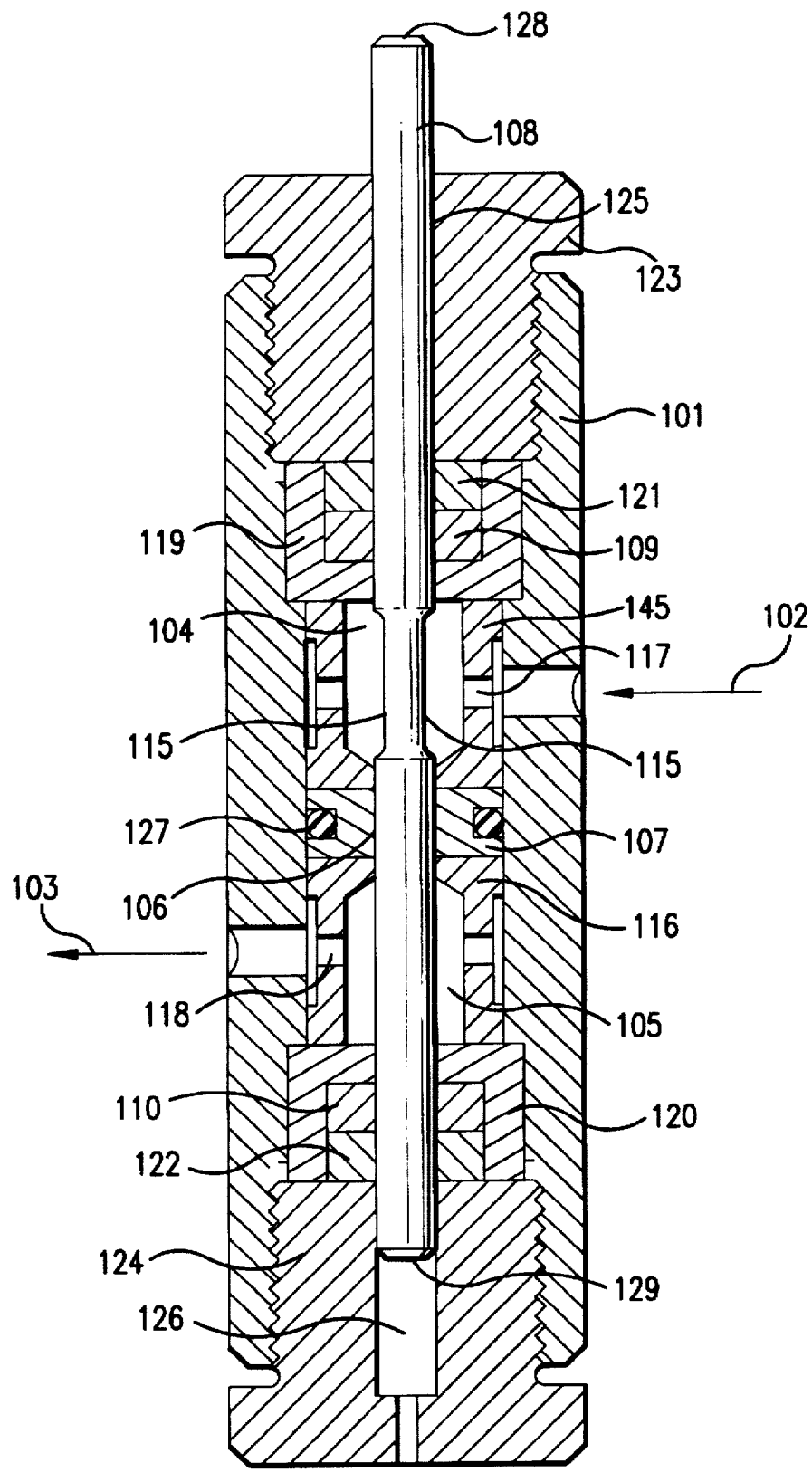
FIG. 2 is a partial cross-sectional side view taken along a longitudinal axis of an instant on-off valve, according to another preferred embodiment of this invention, with a valve port in a closed position.
Figure 3:
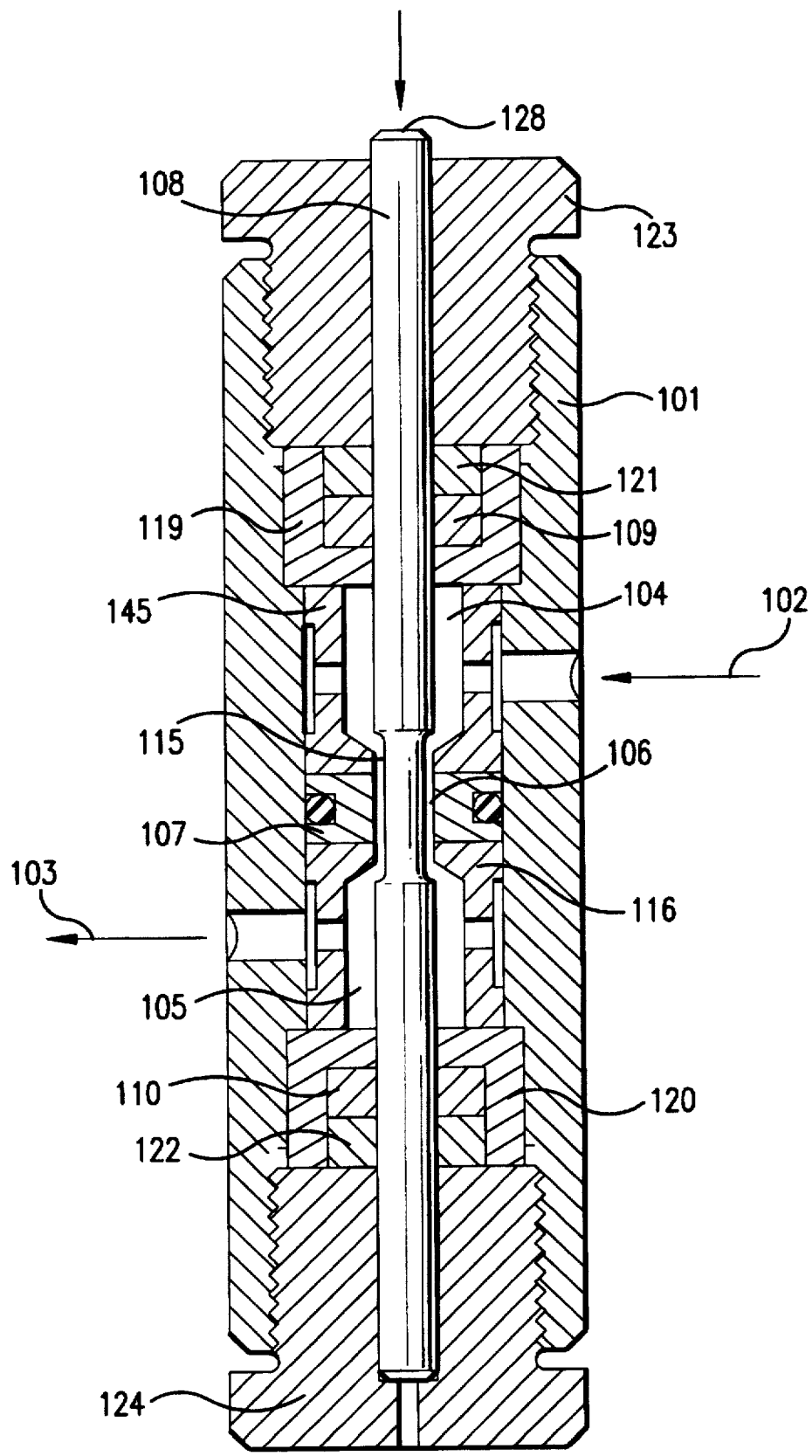
FIG. 3 is a partial cross-sectional side view taken along a longitudinal axis of an instant on-off valve, according to another preferred embodiment of this invention, with a valve port in an open position.
Figure 5:
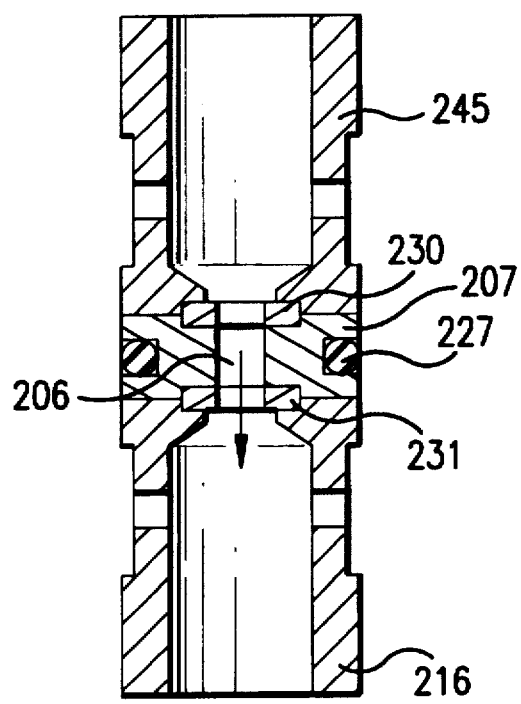
FIG. 5 is a cross-sectional side view taken along a longitudinal axis of a valve port seal assembly and support bushings, having two hard seal bushings for protecting the valve-port seal, according to another preferred embodiment of this invention.
Figure 6:
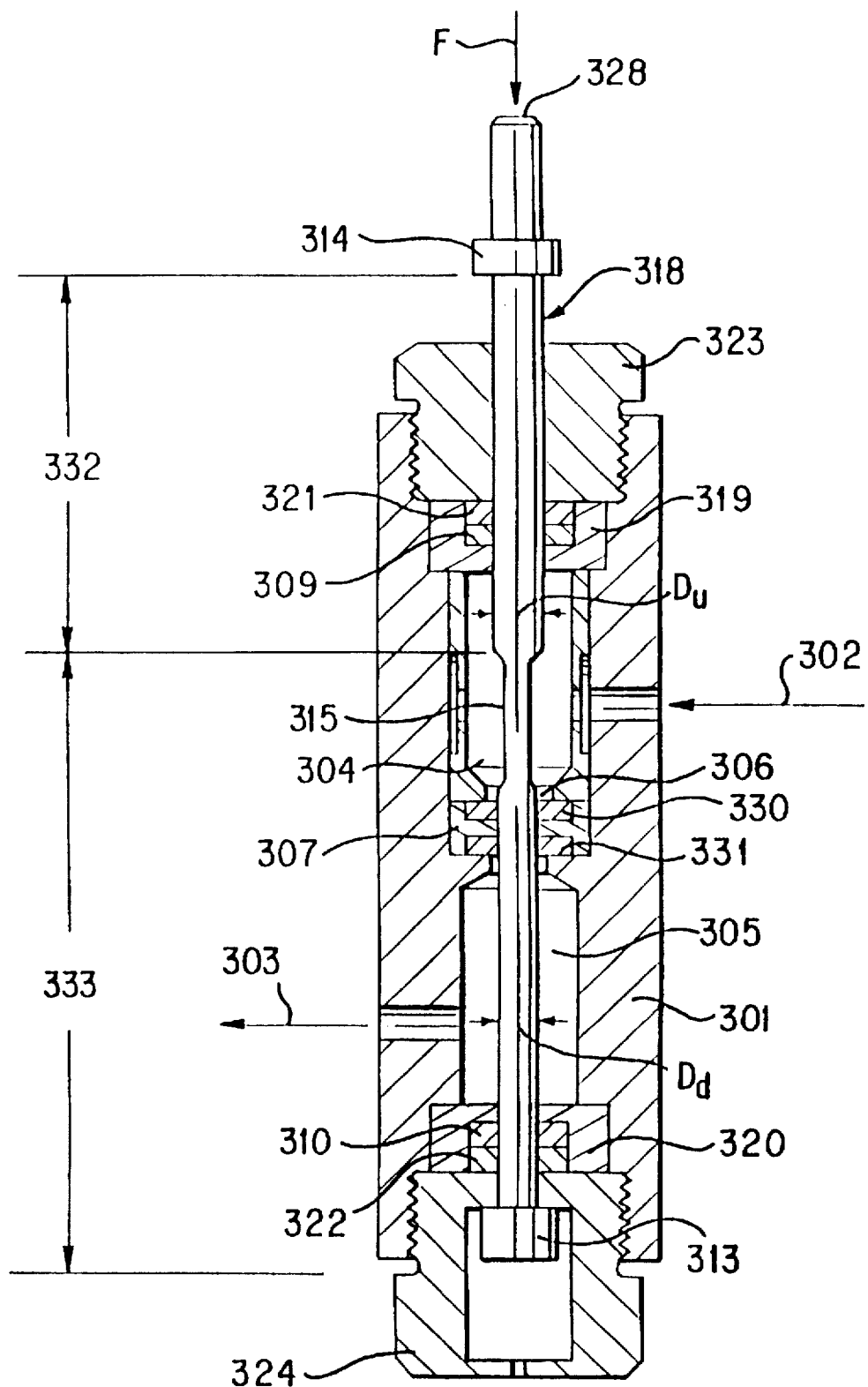
FIG. 6 is a simplified cross-sectional side view of an instant on-off valve, according to yet another preferred embodiment of this invention, showing a valve stem having an upstream diameter greater than a downstream diameter for accommodating normally-closed operation of the valve.
Figure 7:
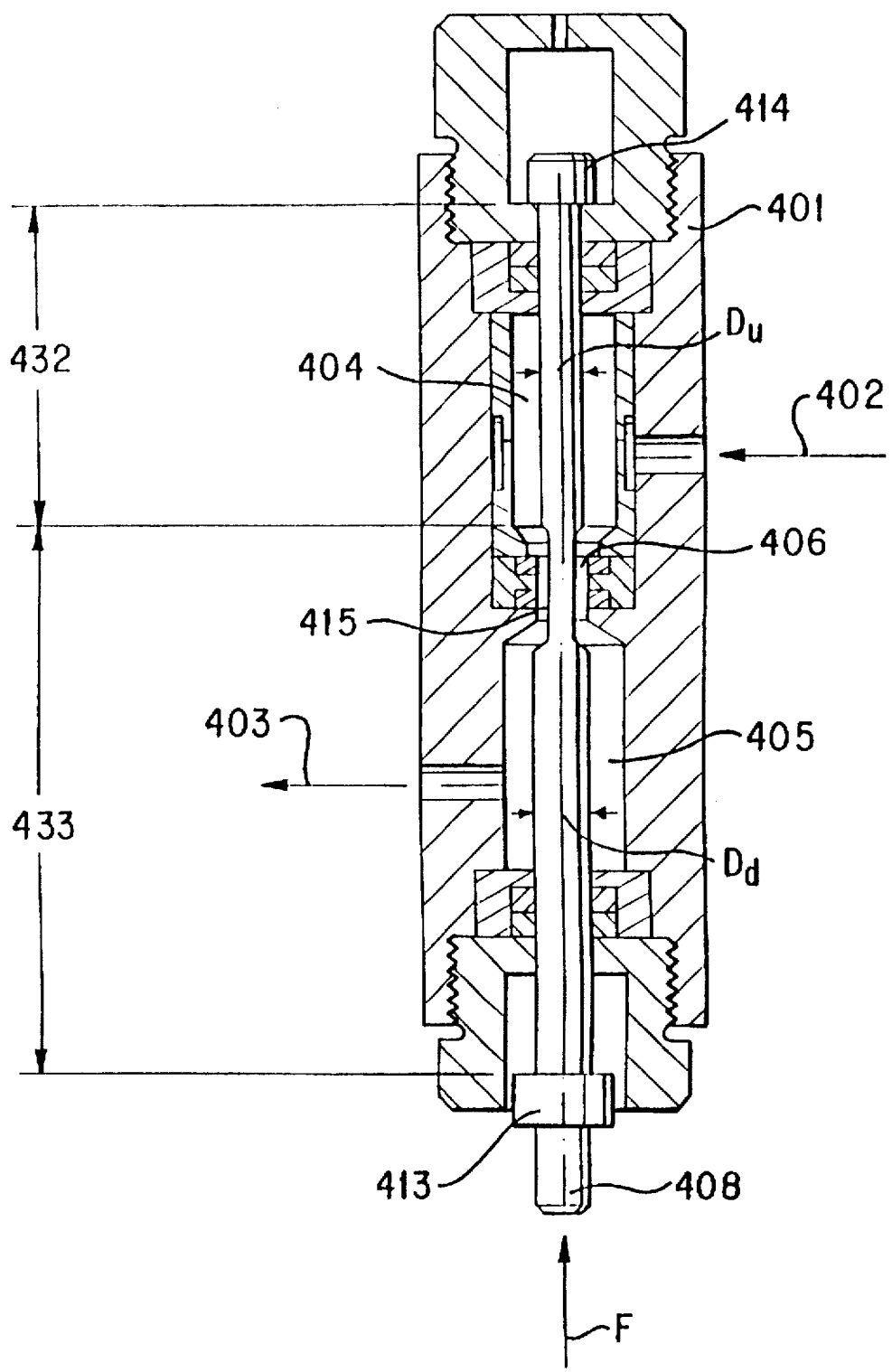
FIG. 7 is a simplified cross-sectional side view of an instant on-off valve, according to still another preferred embodiment of this invention, with a valve stem having an upstream diameter less than a downstream diameter for normally-open operation of the valve.
Figure 8:
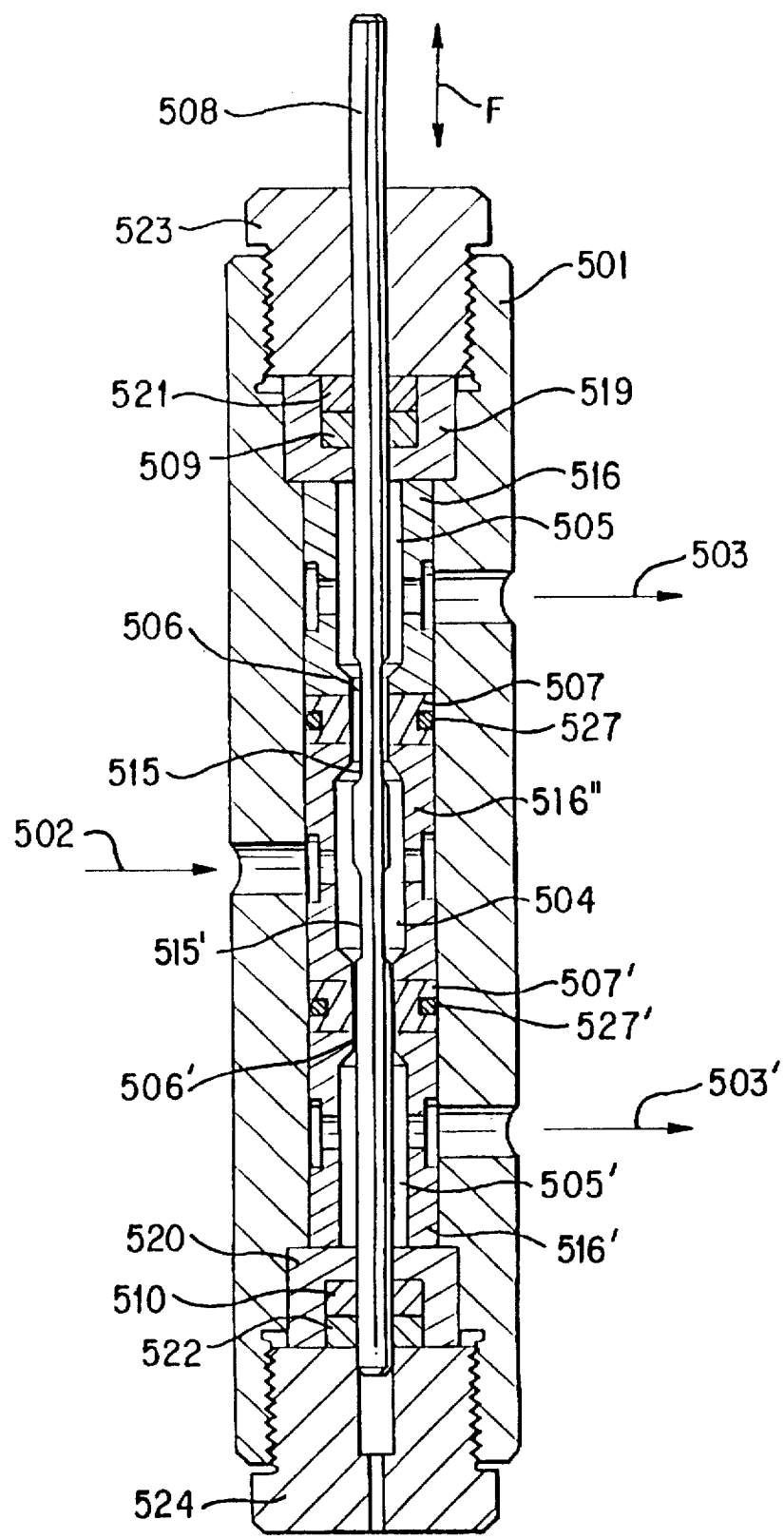
FIG. 8 is a partial cross-sectional side view of an instant on-off valve, according to still another preferred embodiment of this invention, with the valve having one inlet and two separate outlets which are operated alternately.
Figure 9:
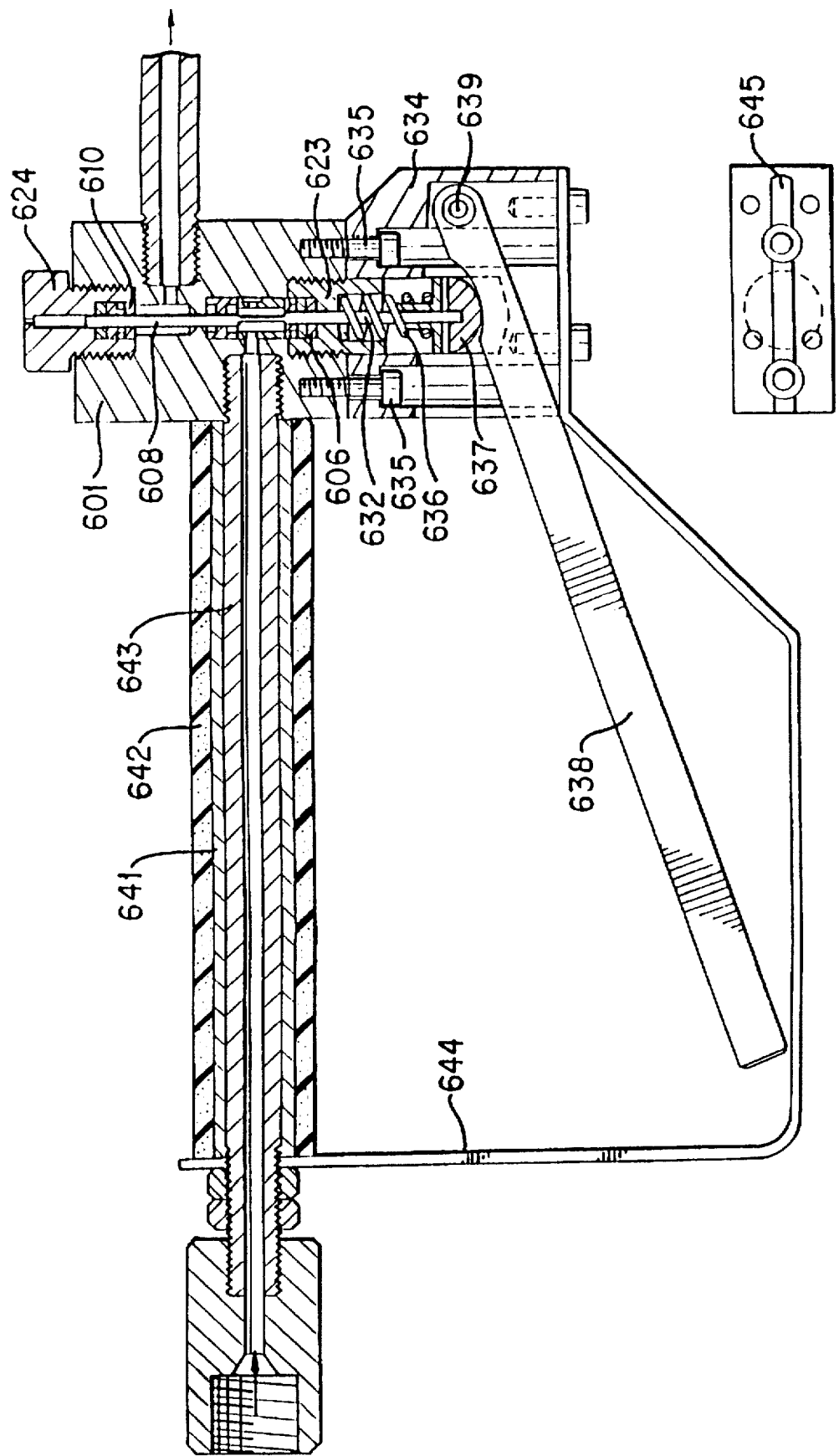
FIG. 9 is a partial cross-sectional view, taken along a longitudinal axis, of an instant on-off valve with an adapter and handle arrangement, according to one preferred embodiment of this invention.
Figure 10:
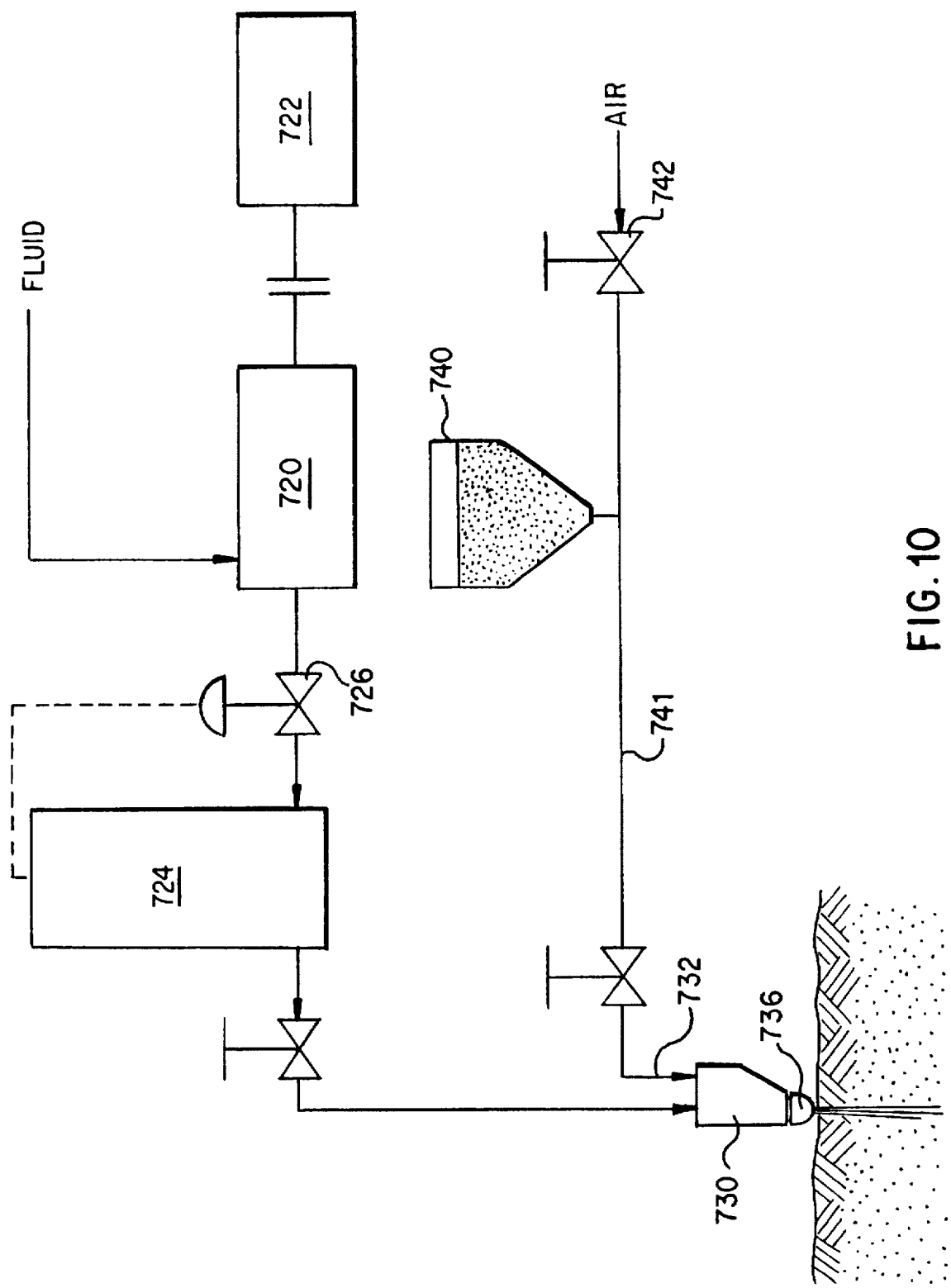
FIG. 10 is a block diagram illustrating essential system components for implementing an injection method according to one preferred embodiment of this invention, and illustrating the use of a reciprocating crankshaft pump equipped with an automatic pressure relief system.

FIG. 10 shows a schematic diagram of essential system components, according to another preferred embodiment of this invention. Such system comprises: a suitable pump driven by driver 722, which is preferably an electric motor or other suitable engine, depending upon the conditions under which driver 722 operates; high-pressure fluid accumulator 724; control valve 726; injection nozzle 730; material storage hopper 740; and any necessary conduits, such as tubes or hoses. A water or water-based solution of selected material is pressurized with a suitably selected pump 720 and routed through fluid accumulator 724 to injection nozzle 730, thereby generating a waterjet. The waterjet produces a relatively powerful vacuum which is capable of drawing selected powder solids into the waterjet stream and thus injecting it into the ground, for example. Throughout this specification and in the claims, the term waterjet is intended to be interchangeable with the term fluid jet.

Pump 720 can be a conventional triplex crankshaft positive-displacement pump, for example one capable of generating 20,000 psi peak pressure. Pump 720 is preferably equipped with a suitable pressure relief valve so that the discharge of pump 720 can be completely shut-off without damaging pump 720.

Driver 722 is preferably an electric motor for indoor applications and preferably a combustion engine, such as a diesel engine, for outdoor applications. In most instances, a peak fluid pressure of approximately 20,000 psi at the discharge of pump 720 is sufficient. However, certain situations may require greater discharge pressures from pump 720. In such case, a hydraulically-operated pressure intensifier can be used to pressurize the water or other solution, in lieu of a direct-driven crankshaft pump 720.

Pressurized water from pump 720 is routed through on-off control valve 726 to high-pressure accumulator 724, which has a volume capacity determined by the particular application and available system power. On-off control valve 726 is preferably powered with an actuator that can be operated with compressed air or hydraulic fluid. Operation of on-off control valve 726 is related to the operation of fluid accumulator 724. For example, when control valve 726 is open, accumulator 724 is typically in the process of being filled, and when control valve 726 is closed, accumulator 724 is typically full.

The discharge of fluid accumulator 724 is preferably in communication with a hand-operated on-off valve, through a high-pressure conduit, such as a hose or tube. The hand-operated on-off valve preferably discharges to injection nozzle 730, such as with a short section of high-pressure tubing.

Figure 11:
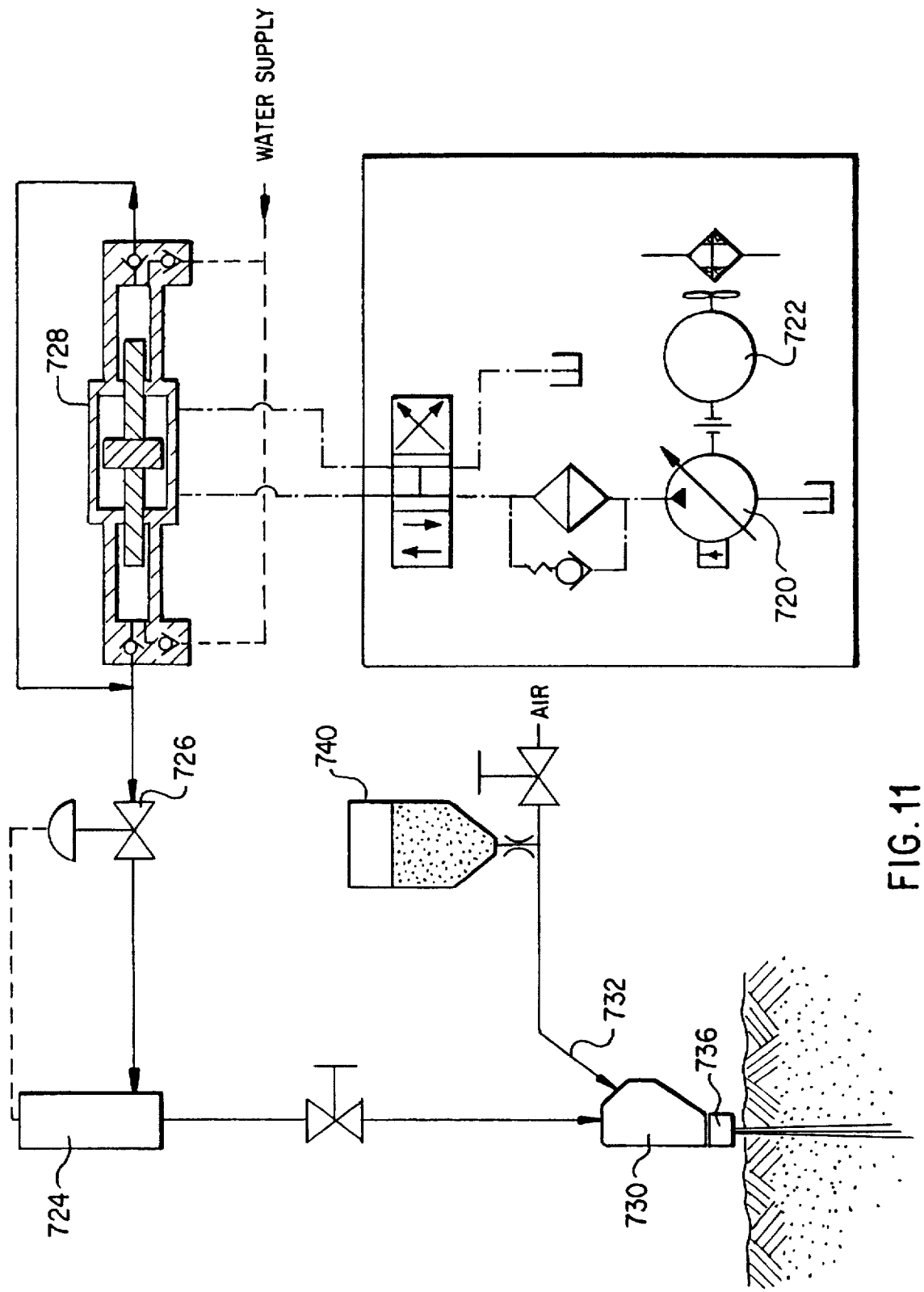
FIG. 11 is a block diagram illustrating essential system components for implementing an injection method according to another preferred embodiment of this invention, wherein a hydraulically-operated pressure intensifier is used to produce pressurized water.
Figure 14:
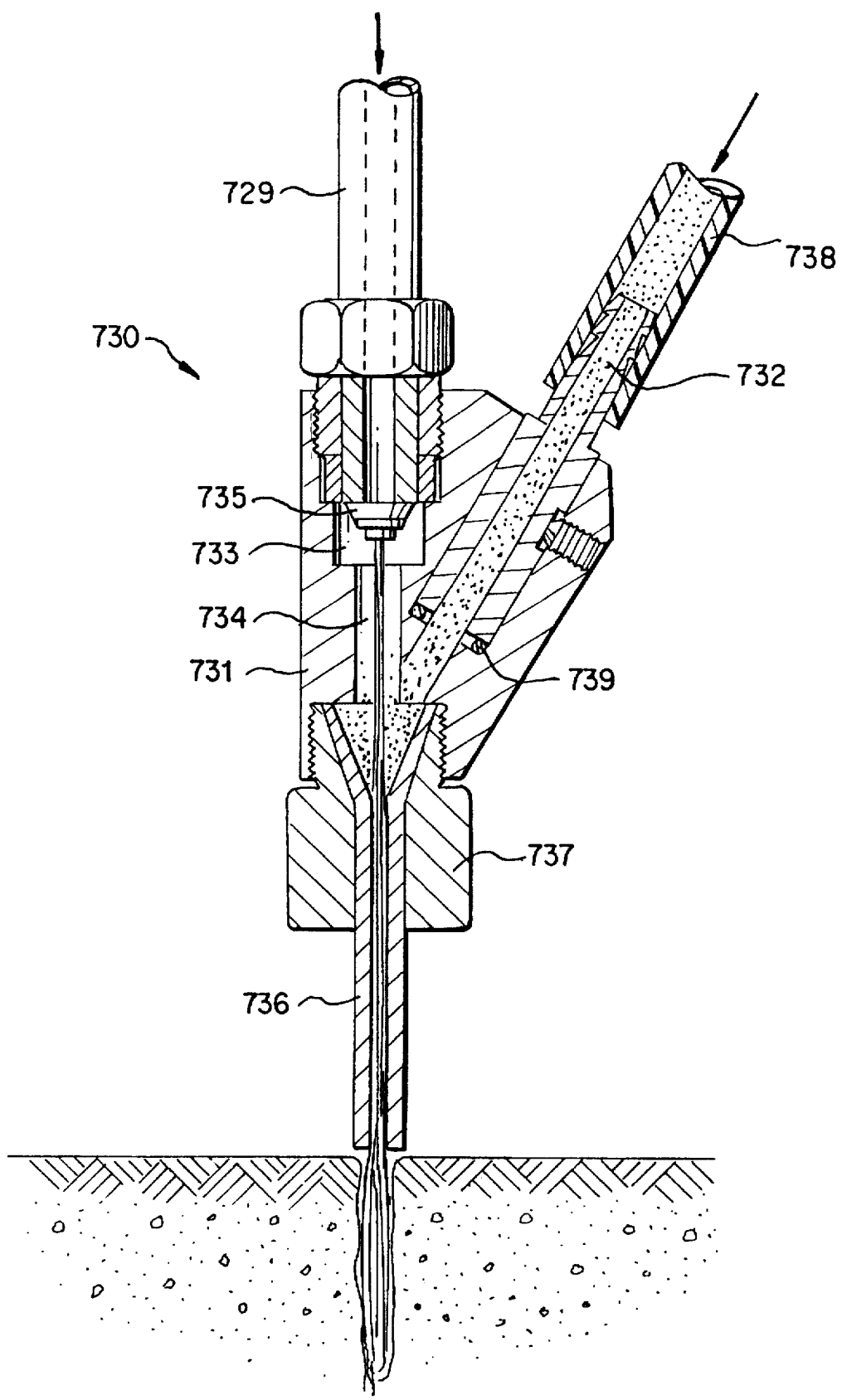
FIG. 14 is a partial cross-sectional view of an injection nozzle, according to one preferred embodiment of this invention.
Figure 15:
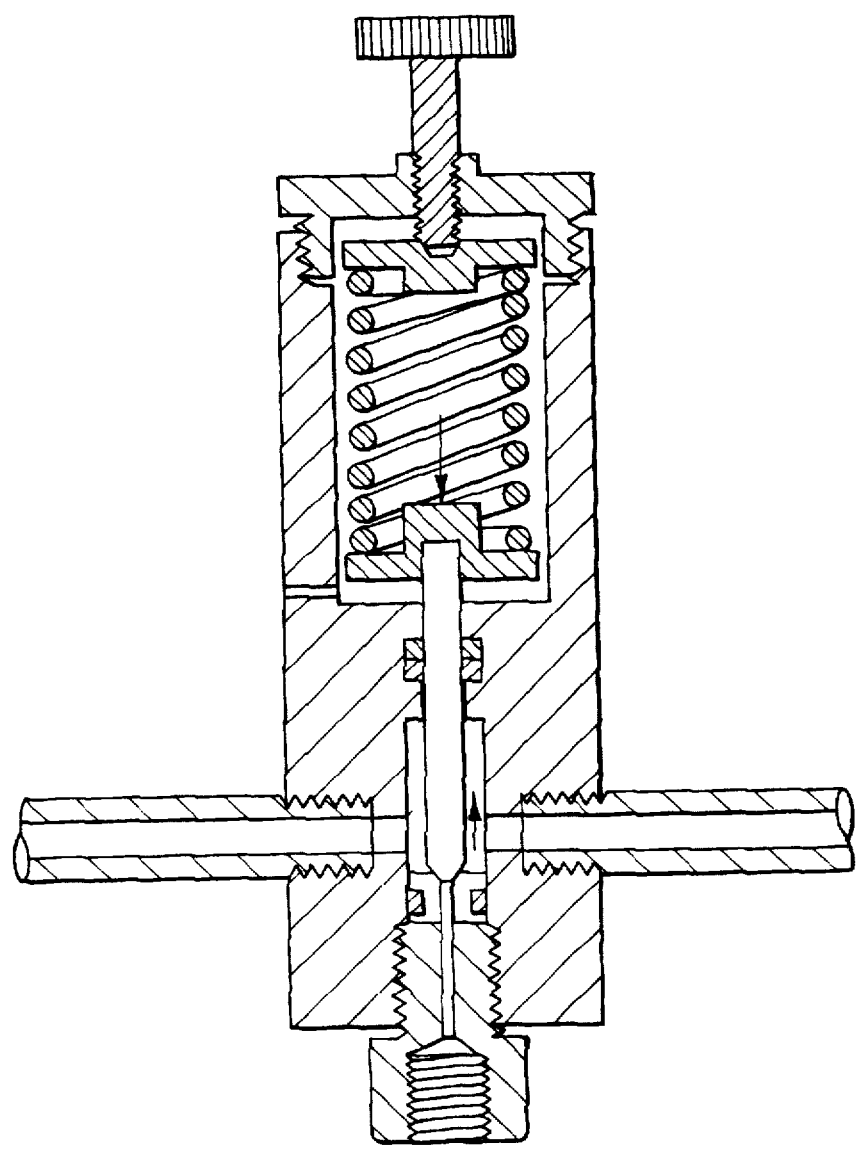
FIG. 15 shows a partial cross-sectional front view of a conventional bypass valve.
Figure 16:
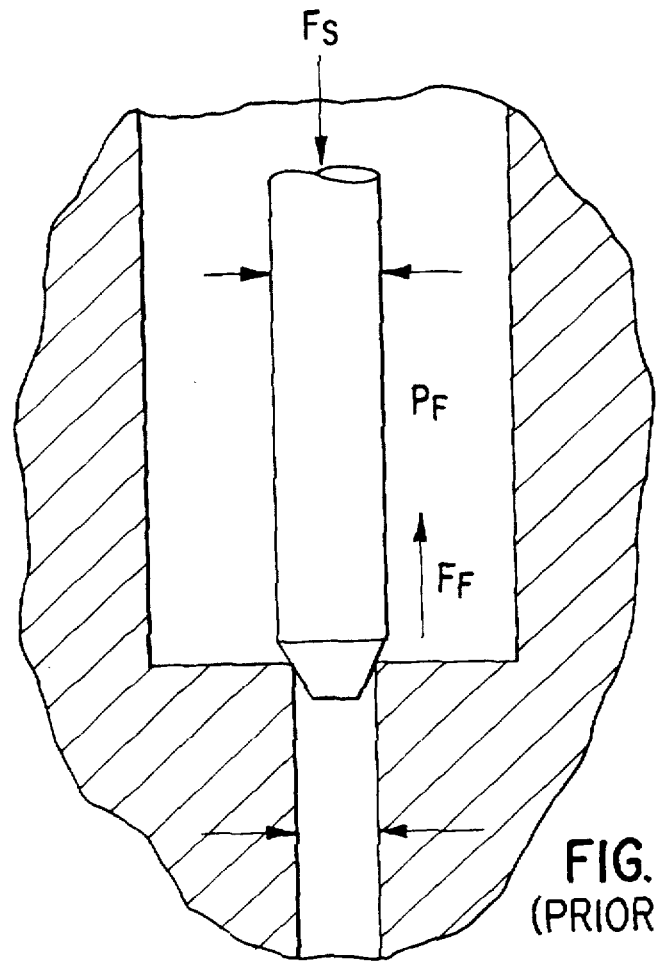
FIG. 16 shows an enlarged partial cross-sectional front view of a portion of the valve plunger and bypass port shown in FIG. 15.
Figure 17:
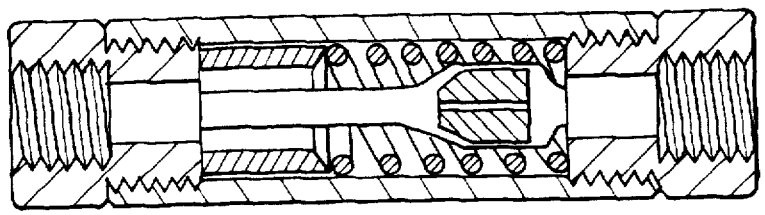
FIG. 17 shows a partial cross-sectional front view of a conventional automatic excess-flow protection valve, in an open position.
Figure 18:
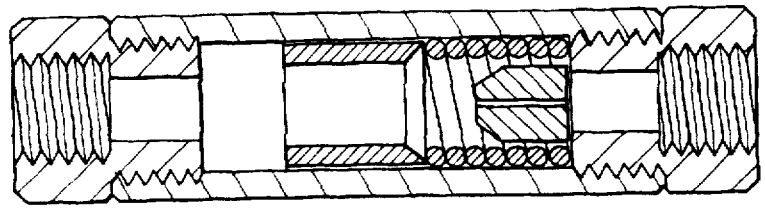
FIG. 18 shows the conventional automatic excess-flow protection valve shown in FIG. 17, but in a closed position.

According to one preferred embodiment of this invention, injection nozzle 730 has side inlet 732, as shown in FIG. 14, for introducing additives into a waterjet stream. The additive, typically in the form of a dry powder, is preferably stored in storage hopper 740, as shown in FIGS. 10 and 11. Near a bottom of storage hopper 740, a discharge branches into a tee, which has one branch in communication with a flexible hose leading to injection nozzle 730 and another branch in communication with valve 742. Valve 742 is preferably used to control the amount of atmospheric air admitted into the flexible hose for fluidizing the powder additive.

When a high-velocity waterjet is introduced within injection nozzle 730, a powerful vacuum is created, which draws the dry powder additive from a distant storage tank, such as storage hopper 740, to injection nozzle 730. Once admitted within injection nozzle 730, the dry powder additive contacts the waterjet and is ejected from injection nozzle 730, along with the waterjet. Flow of the dry powder additive continues while the waterjet flows through injection nozzle 730.

The amount of additive that passes through injection nozzle 730 with the waterjet depends upon several factors, including the mass flow rate of the waterjet and the particular design of injection nozzle 730. The resultant slurry jet discharged from injection nozzle 730 can penetrate into the ground, depending upon several factors, such as the total power of the pulsed-jet, the physical nature of the additive, a stand-off distance of injection nozzle 730, and geological characteristics of the ground.

The total power (p) of a pulsed-jet or waterjet discharged from injection nozzle 730 can be a function of parameters such as the diameter of the nozzle and the velocity of the waterjet:

$$p_j = (\pi/8)\rho d^2 v^3 \quad \text{Equation 1}$$

where d=diameter of waterjet, ρ=density of water, and v=velocity of waterjet. The total work done by a pulsed jet in penetrating into the ground can be calculated by using the following equation:

$$\omega=(\pi/8)\rho d^2 v^3 t=(\pi/4)Pd^2vt \qquad \text{Equation 2}$$

where t=duration of the jet pulse, and P=stagnation pressure of the pulsed jet. It is thus obvious that achieving maximum penetration of a fluid jet into the ground is related to relatively large and high-velocity fluid jets.

FIG. 11 shows a pulsed-jet injection system, according to another preferred embodiment of this invention, which typically uses a hydraulically-driven fluid pressure intensifier 728 to pressurize water. Pressure intensifier 728 can be used in extremely high-pressure applications, such as those which operate at above approximately 20,000 psi. The extremely high-pressure intensifier 728 is characterized by reliability and an ability to completely block or shut-off the discharge. Such feature is particularly advantageous in pulsed-jet applications, in which the pump discharge is frequently interrupted, such as in a pulsed-jet injection system. In order to shut-off or completely block the discharge of a rotating or crankshaft type pump 720, a pressure regulator or an unloading valve is necessary. Reliable high-pressure unloading valves are relatively rare and expensive.

Figure 12:
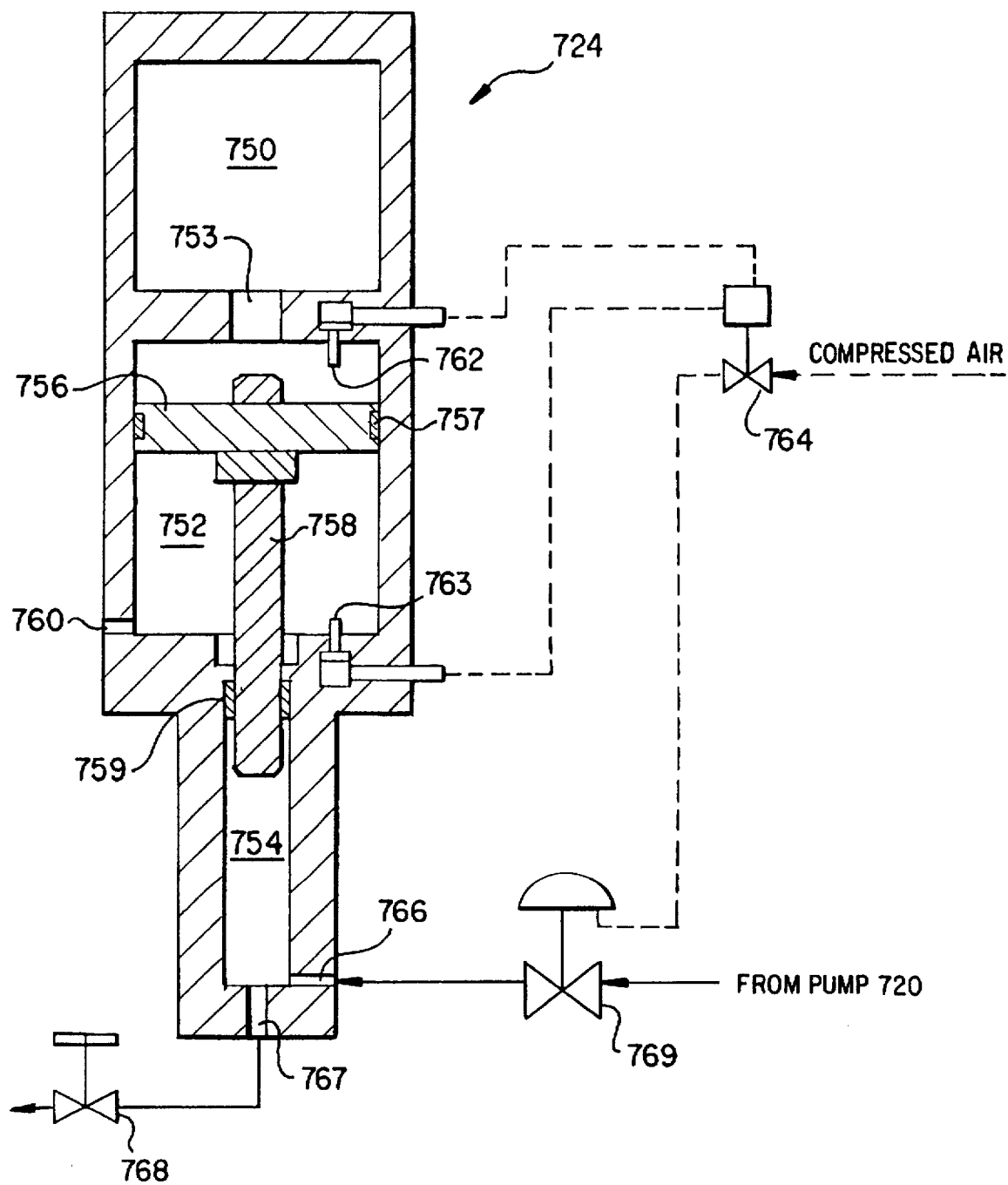
FIG. 12 is a partial cross-sectional view of a high-pressure accumulator, according to one preferred embodiment of this invention, suited for generating high-power and high-velocity pulsed waterjets or other fluid jets.

FIG. 12 shows a high-pressure accumulator 724, according to another preferred embodiment of this invention, that serves as a power storage device in a system according to this invention. Because a pulsed-jet must have a relatively high mass flow rate, such as a rate beyond the capability of conventional pumps, in order to be useful, a storage device is used to build a charge. Accumulator 724 is analogous to a capacitor in an electrical system, in which high-voltage potential energy is stored and then suddenly discharged to produce a high-energy spark, for example. In the high-pressure fluid system according to one preferred embodiment of this invention, fluid accumulator 724 is used to store potential energy of the working fluid, so that such stored potential energy can be quickly released upon command.

As shown in FIG. 12, fluid accumulator 724 of this invention comprises a three-section assembly, such as a cylinder assembly, capable of handling fluids at extremely high pressures. Accumulator 724 preferably comprises upper gas chamber 750, middle working chamber 752 which accommodates reciprocating piston 756, and lower high-pressure chamber 754 which accommodates plunger 758, as shown in FIG. 12.

Upper gas chamber 750 is normally filled with a suitable working gas, such as nitrogen, at a prescribed pressure. Gas chamber 750 is in communication with working chamber 752, such as through central passage 753. Piston 756 is mounted within working chamber 752 and seal 757 is positioned between piston 756 and a wall defining working chamber 752, so as to form a gas-tight seal between gas chamber 750 and working chamber 752. As shown in FIG. 12, the lower portion of working chamber 752 is in communication with the atmosphere through weep hole 760.

Piston 756 is mechanically connected to plunger 758 which has a diameter designed such that the cross-sectional area of piston 756 and the cross-sectional area of plunger 758 are in a prescribed ratio, and such that the nitrogen gas within gas chamber 750 can exert a prescribed force to the fluid within high-pressure chamber 754, acting against plunger 758.

As shown in FIG. 12, sensor 762 and sensor 763 are positioned at two opposite ends of working chamber 752, one on each side of piston 756, for monitoring the position of piston 756. Sensors 762 and 763 electronically communicate with solenoid valve 764, which controls the flow of compressed air for operating another water valve that sends water from pump 720 to high-pressure chamber 754. Plunger seal assembly 759 is mounted within the housing of accumulator 724, such that fluid within high-pressure chamber 754 is sealed with respect to the atmosphere within working chamber 752. The housing of accumulator 724 also has inlet 766 and discharge 767 for passing water through high-pressure chamber 754.

As shown in FIG. 12, piston 756 and plunger 758 of high-pressure accumulator 724 are at a lowermost position when high-pressure water is not present within high-pressure chamber 754, as pressurized nitrogen or another suitable gas exerts a force against piston 756. Piston 756 preferably contacts lower sensor 763 when the inlet on-off valve is open. As pressurized water enters high-pressure chamber 754, through inlet on-off valve 768 while outlet on-off valve 769 is closed, plunger 758 is forced upward until high-pressure chamber 754 is filled with high-pressure water. At such point, piston 756 preferably contacts upper sensor 762 and thus signals solenoid valve 764 to allow compressed air to flow to shut-off inlet on-off valve 769 for the water. It is thus apparent that the nitrogen gas becomes pressurized as a function of the incoming water pressure, which forces piston 756 upward to compress the nitrogen gas. After high-pressure chamber 754 is filled with the high-pressure water, accumulator 724 is fully charged with potential energy, ready to produce work. When discharge 767 is quickly opened, water within high-pressure chamber 754 is discharged rapidly due to the force exerted on piston 756 by the nitrogen gas, until high-pressure chamber 754 empties. The high-velocity waterjet discharged from accumulator 724 accomplishes many objects of this invention and is used to generate high-velocity pulsed waterjets or other suitable fluid jets, particularly those directed through a suitable injection nozzle 730. Accumulator 724 is preferably designed so that continued force from the nitrogen gas causes the water discharged from accumulator 724 to maintain its velocity until high-pressure chamber 754 empties.

Still referring to FIG. 12, the pressure relationship of the water and the nitrogen gas within accumulator 724 can be illustrated in another preferred embodiment according to this invention. Assuming the maximum pressure of the water from pump 720 is approximately 20,000 psi, the area ratio of piston 756 to plunger 758 is 12:1, and the cross-sectional area of plunger 758 is 1.0 in$^2$, a force of approximately 20,000 lb$_f$ is exerted on the end of plunger 758 when the water enters accumulator 724. Such 20,000 lb$_f$ is transmitted to the nitrogen gas through piston 756 and is distributed over the entire piston area at approximately 1,670 lb$_f$ per in$^2$. Thus, in such preferred embodiment the nitrogen gas should not be pressurized above such pressure reading, according to such preferred embodiment of this invention, if accumulator 724 is to function properly. The nitrogen gas should be charged at an initial pressure such that the final pressure is approximately 1,670 psi. It is apparent that the initial charge pressure depends upon the total volume of accumulator 724 and such value can be calculated.

Figure 13:
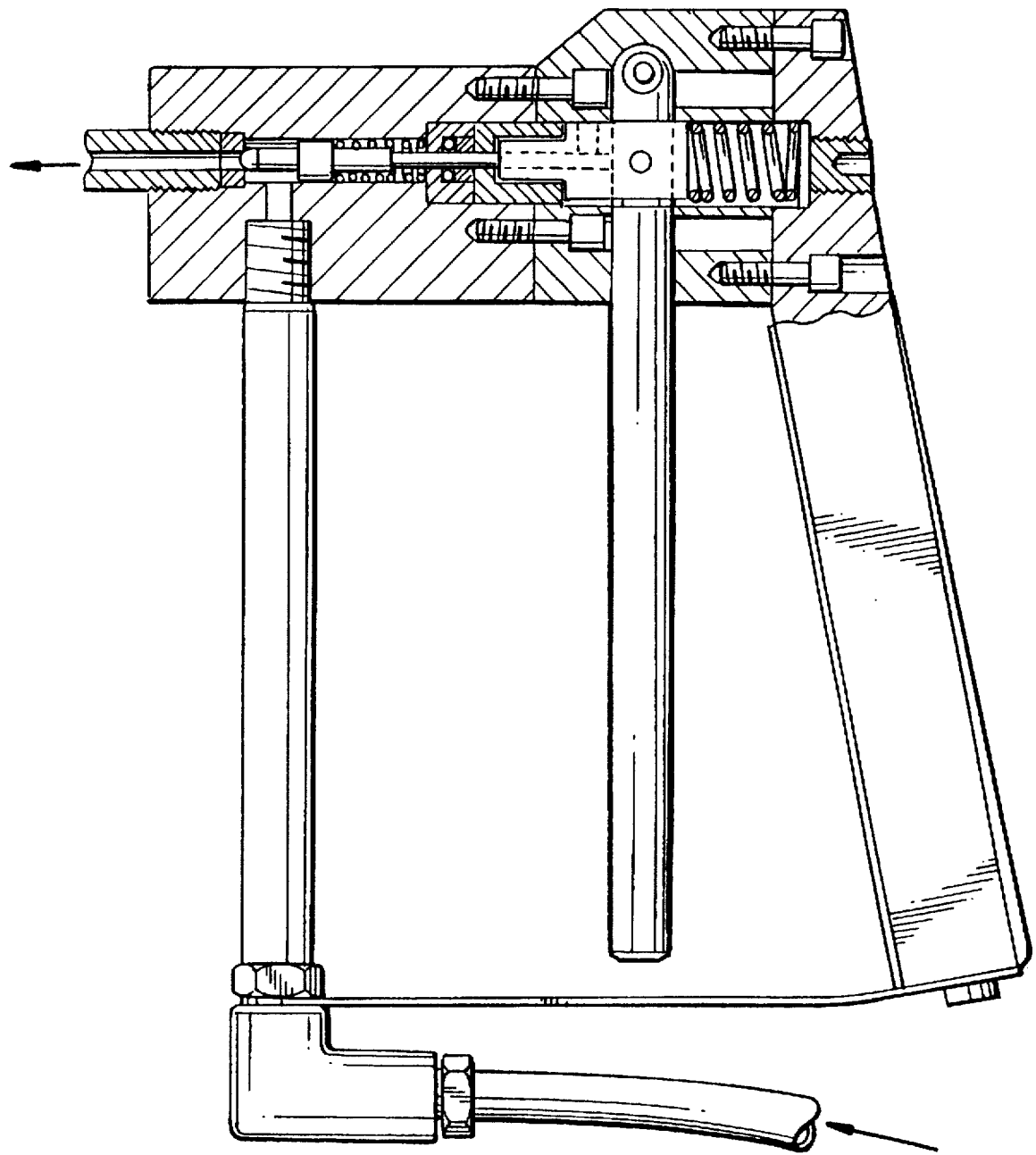
FIG. 13 is a partial cross-sectional side view of a hand-operated, instant on-off valve, according to one preferred embodiment of this invention, suited for implementing material injection.

FIG. 13 shows a hand-operated on-off high-pressure valve which can be used with the method and apparatus of this invention. Such hand-operated on-off valve is taught by U.S. Pat. No. 5,092,362, and the teachings of such patent are incorporated into this specification by reference. High-pressure water passes through a conduit, such as a flexible hose, to a valve cavity in which a reciprocating valve poppet is positioned. The valve poppet normally closes the valve port and blocks the flow of high-pressure water. To open the valve, a trigger lever is pulled toward a handle, as shown in FIG. 13. The trigger lever exerts a force upon several internal valve elements to mechanically pull the valve poppet away from a valve port, thereby allowing the high-pressure water to flow through an inlet and a discharge of the valve. With such on-off valve, the valve port can be closed by releasing the trigger lever and causing a closure spring to exert a force upon a valve stem, which moves to engage the valve poppet and block the valve port. Such hand-operated on-off valve is well-suited for acting as an injection nozzle, according to this invention, since the opening and closing action of the valve port is extremely fast.

Referring now to FIG. 14, injection nozzle 730 according to this invention is capable of generating a high-velocity waterjet and thereby creating a high-power vacuum within nozzle cavity 734 which can be used to draw additives into the waterjet stream. Injection nozzle 730 comprises nozzle body 731 which preferably has a circular orifice cavity 733 that houses an interchangeable orifice cone 735 which supports a high-precision gemstone, such as a sapphire, ruby or diamond orifice, that is used to generate a waterjet at high pressures.

A high-pressure conduit, such as tube or hose 729 preferably mates directly with orifice cone 735 through a suitable fitting or a suitable adapter. Nozzle body 731 has nozzle cavity 734 which communicates between orifice cavity 733 and a throughbore within slurry nozzle 736. The waterjet travels through nozzle cavity 734 and into the throughbore of slurry nozzle 736. Slurry nozzle 736 is preferably constructed of a relatively hard material, such as tungsten carbide. Slurry nozzle 736 has a tapered or funnel-shaped entrance which merges into a relatively straight body. Slurry nozzle 736 preferably abuts nozzle body 731, as shown in FIG. 14, which can be accomplished by tightening threaded nozzle extension 737 with respect to nozzle body 731.

Additives enter nozzle cavity 734 through a replaceable feed tube 738 that is preferably anchored by a set screw, as shown in FIG. 14. Feed tube 738 is sealed with respect to nozzle body 731 by O-ring seal 739, which preferably forms an air-tight seal. The additives are transported to feed tube 738 through a conduit, such as tube or hose 741. When a high-speed waterjet is issued through the orifice mounted within orifice cone 735 and through slurry nozzle 736, a powerful vacuum is generated within nozzle cavity 734, which draws dry or wet additives into nozzle cavity 734. Once within nozzle cavity 734, the additives are discharged from slurry nozzle 736 with the waterjet and then can be directly injected into the ground.

The degree of vacuum generated within nozzle cavity 734 is a function of the velocity and flow rate of the waterjet, as well as the inside diameter and length of slurry nozzle 736. It is very important to precisely aline the slurry nozzle 736 so that the waterjet freely passes through the straight body portion of slurry nozzle 736. A particularly suitable injection nozzle that can be used with the apparatus and method of this invention is taught by U.S. Pat. No. 4,478,368, the teachings of which are fully incorporated into this specification by reference.

In field operations, the method and apparatus of this invention can be used with a mobile trailer or truck that has a pump and material storage equipment. An operator can carry the hand-operated valve and injection nozzle 730 which are connected by hoses to pump 720 and material storage hopper 740. The operator can position injection nozzle 730 at a desired location and simply pull a trigger against the handle to inject the materials into the ground. The operator can then simply relocate the apparatus of this invention to the next area and can efficiently continue to work. Each time the valve trigger is engaged, high-pressure accumulator 724 empties the water stored within it and then refills high-pressure chamber 754 with water for the next shot-operation. Only one pulse-jet can be generated by pulling the valve trigger. Because the pulsed waterjet generated by the apparatus of this invention has a relatively high velocity throughout the pulse duration, more additives can be admitted into the waterjet stream and thus injected into the ground for penetration to greater depths.

It is apparent that the material injection method according to this invention can be readily converted to automatic mechanical operation by replacing the hand-operated instant on-off valve with a remotely-operated valve. It is also apparent that the mechanical positioning of injection nozzle 730 can be automated.

Figure 19:
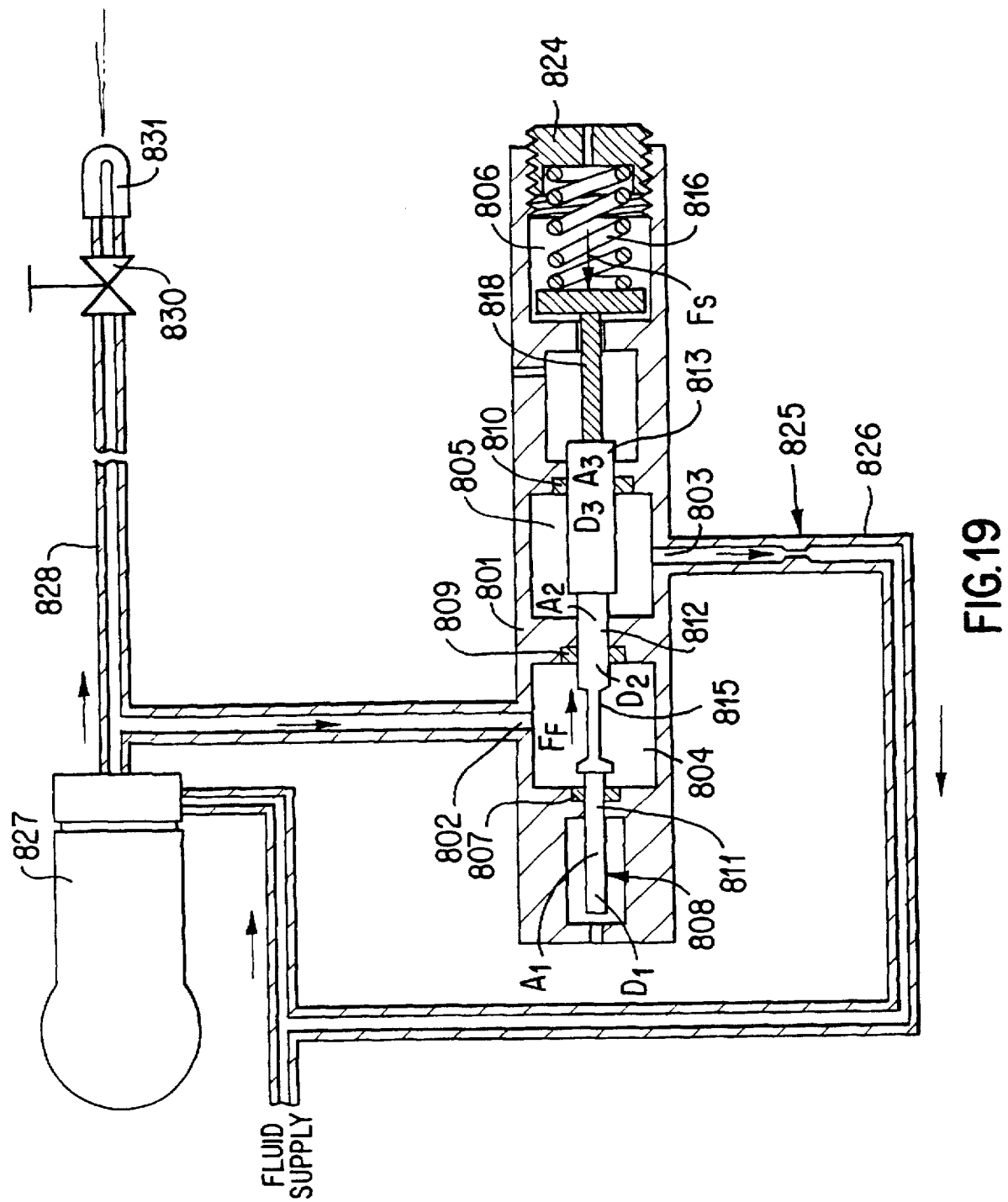
FIG. 19 shows a diagrammatic view of a fluidic system and a partial cross-sectional front view of a valve, in a closed position, according to one preferred embodiment of this invention.

FIG. 19 shows a partial cross-sectional front view of a bypass valve in a closed position, designed to operate in a relatively high-pressure fluidic system, according to one preferred embodiment of this invention. When fluid pressure inside chamber 804 exceeds a set value, valve stem 808 moves, as described below, and results in fluidic communication between chamber 804, chamber 805 and fluid outlet 803, thus reducing the system fluid pressure.

According to one preferred embodiment of this invention, the bypass valve comprises valve body 801 which has a central cylindrical overall cavity in which valve stem 808 is slidably mounted. Valve stem 808 is an overall elongated member having various diameters, as shown in FIG. 19. Stem seals 807, 809 and 810 are mounted in the cylindrical cavity, sealably contact valve stem 808, and divide the central cylindrical overall cavity into multiple chambers, including chamber 804 and chamber 805. Chambers discussed throughout this specification and in the claims are considered as either upstream chambers or downstream chambers, depending upon the relative direction of the fluid flow through the valve. According to one preferred embodiment of this invention as shown in FIG. 19, chamber 804 is an upstream chamber with respect to chamber 805, and chamber 805 is a downstream chamber with respect to chamber 804.

As shown in FIG. 19, stem seal 807 sealably contacts stem portion 811, stem seal 809 sealably contacts stem portion 812, and stem seal 810 sealably contacts stem portion 813. Stem portion 811 has diameter $D_1$ and cross-sectional area $A_1$, stem portion 812 has diameter $D_2$ and cross-sectional area $A_2$, and stem portion 813 has diameter $D_3$ and cross-sectional area $A_3$. As shown in FIG. 19, $D_3 > D_2 > D_1$ and $A_3 > A_2 > A_1$. Stem seal 807 and stem seal 809 seal chamber 804 which is in communication with fluid inlet 802. Stem seal 809 and stem seal 810 seal chamber 805 which is in communication with fluid outlet 803. End portions of stem portions 811 and 813 extend beyond seals 807 and 810, respectively, and are exposed to the surrounding atmosphere by way of weep holes within valve body 801.

Stem portion 813 abuts rod 818. Rod 818 contacts one end of closure spring 816. Closure spring 816 is housed inside cylindrical cavity 806. An opposite end of closure spring 816 abuts plug 824 which is threadedly engaged within valve body 801. Thus, plug 824 can be rotated to compress closure spring 816. Closure spring 816 returns valve stem 808 to a closed position after valve stem 808 has been opened by fluid-induced forces. It is apparent that other biasing means known to those skilled in the art could be used in place of closure spring 816 to urge valve stem 808 to a normally-closed position.

Figure 20:
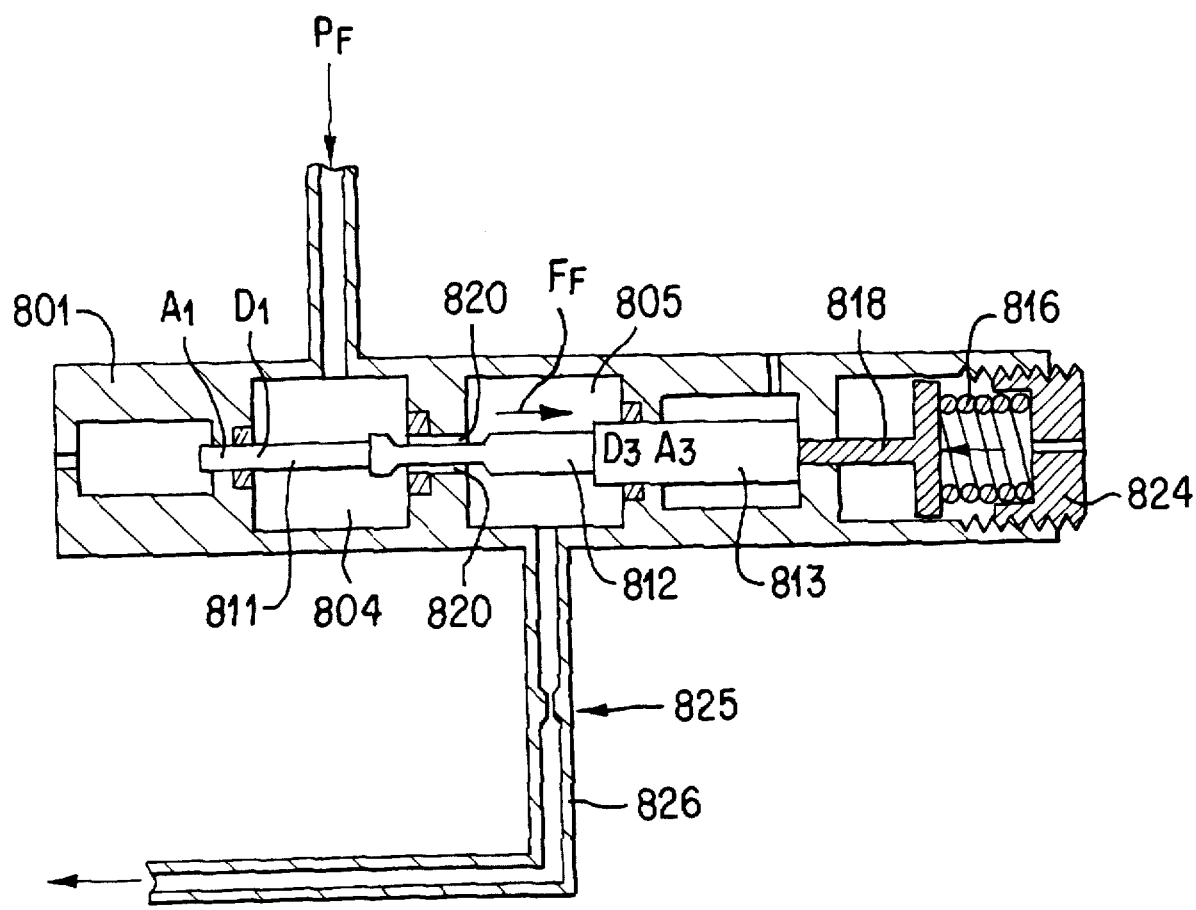
FIG. 20 shows a partial cross-sectional front view of the valve shown in FIG. 19, but in an open position.

When fluidic pressure moves valve stem 808, fluid passage 815 straddles stem seal 809, resulting in fluidic communication between fluid inlet 802, chamber 804, chamber 805 and fluid outlet 803, as shown in FIG. 20. The geometry of fluid passage 815 is preferably in proper relationship with the design of valve port 820 and the movement of valve stem 808. If there is insufficient fluid pressure in chamber 804, closure spring 816 biases sufficient force on rod 818 to urge valve stem 808 into a closed position, as shown in FIG. 19. If a pressurized fluid enters chamber 804, a fluid-induced force $F_F$ is produced which urges valve stem 808 toward an open position, as shown in FIG. 19. The magnitude of such fluid force is $F_F=P_{system}(A_2-A_1)$, where $P_{system}$ is the fluid pressure within chamber 804. If fluid-induced force $F_F$ is sufficiently large, valve stem 808 moves so that fluid passage 815 straddles stem seal 809, and chambers 804 and 805 are in fluidic communication with each other. Thus, in the open position shown in FIG. 20, fluid flows through fluid inlet 802, chamber 804, valve port 820, chamber 805 and fluid outlet 803, at a discharge pressure, which is determined by the piping system downstream of fluid outlet 803, as shown in FIG. 20. When valve stem 808 is in an open position as shown in FIG. 20, the fluid-induced force $F_F$ acting on valve stem 808 is $F_F=P_{system}(A_3-A_1)$.

Stem seals 807, 809 and 810 impose frictional forces on valve stem 808 perpendicular to a longitudinal axis of valve stem 808. Such frictional forces should be considered in determining the level of fluid-induced force $F_F$ required to move valve stem 808 at any given fluid pressure. The fluid-induced force $F_F$ should be great enough to overcome the frictional forces acting upon valve stem 808 by stem seals 807, 809 and 810.

According to one preferred embodiment of this invention, the valve is set by rotating plug 824 to compress closure spring 816 and thus adjust the spring bias force $F_S$, and by allowing the system fluid to reach the desired system pressure. Plug 824 is then rotated back to a set position just prior to that which causes valve stem 808 to move. In such set position, the bias force $F_S$ of closure spring 816 is adequately calibrated for the given system fluid pressure. Valve stem 808 begins to move if the fluidic pressure increases beyond the given system fluid pressure. Contact between stem portion 813 and valve body 801 inhibits oscillation of valve stem 808 when valve stem 808 is in an open position and fluid flows through the valve. Additionally, as diameter $D_3$ of stem portion 813 becomes greater than diameter $D_2$ of stem portion 812, upon a sufficient fluid-induced force $F_F$, valve stem 808 moves farther and more fully opens valve port 820.

A hand operated on-off valve 830 can be adjusted to control water flow through waterjetting nozzle 831. Pump outlet line 828 can be used to communicate pressurized water from pump 827 to waterjetting nozzle 831, as shown in FIG. 19. According to one preferred embodiment of this invention, in order to minimize pressure losses valve body 801 is positioned near an outlet of pump 827. Bypass nozzle 825 is preferably of a size compatible with waterjetting nozzle 831 and is preferably installed in bypass line 826 downstream of fluid outlet 803. Bypass line 826 can connect valve body 801 to a water supply, such as a water supply tank.

Bypass nozzle 825 maintains a nearly constant fluid pressure within pump outlet line 828 despite frequent operations of on-off valve 830. When on-off valve 830 is closed, fluidic pressure in chamber 804 causes movement of valve stem 808, and the valve opens thereby relieving fluidic pressure in the system. When on-off valve 830 is open, fluidic pressure in chamber 804 decreases and valve stem 808 moves to a closed position, and thus, sufficient fluidic pressure is maintained in pump outlet line 828 for waterjetting operations through waterjetting nozzle 831. Such constant fluidic pressure is also desirable for a prime mover, such as an engine, used to power pump 827.

Characteristics of closure spring 816 are determined by the desired system fluidic pressure. If high pressures are desired, closure spring 816 can have a relatively high stiffness, and if lower pressures are desired, closure spring 816 can have a relatively low stiffness. Unlike conventional valves, the valve according to this invention can use common compression springs even for extremely high fluid pressures, including pressures up to approximately 100,000 psi. Further, the stiffness of closure spring 816 depends on diameter $D_3$ of stem portion 813, diameter $D_2$ of stem portion 812, and diameter $D_1$ of stem portion 811, each of which can also be varied according to the fluidic pressures involved. Such design flexibility is not found among conventional valves. Bypass nozzle 825, downstream of fluid outlet 803, opens authoritatively due to the increased fluid-induced force $F_F$ acting on valve stem 808, which compresses closure spring 816. The magnitude of the fluid-induced force $F_F$ can be fine-tuned by sizing diameters $D_3$, $D_2$ and $D_1$, and by sizing bypass nozzle 825 as a function of the size of waterjetting nozzle 831.

Figure 21:
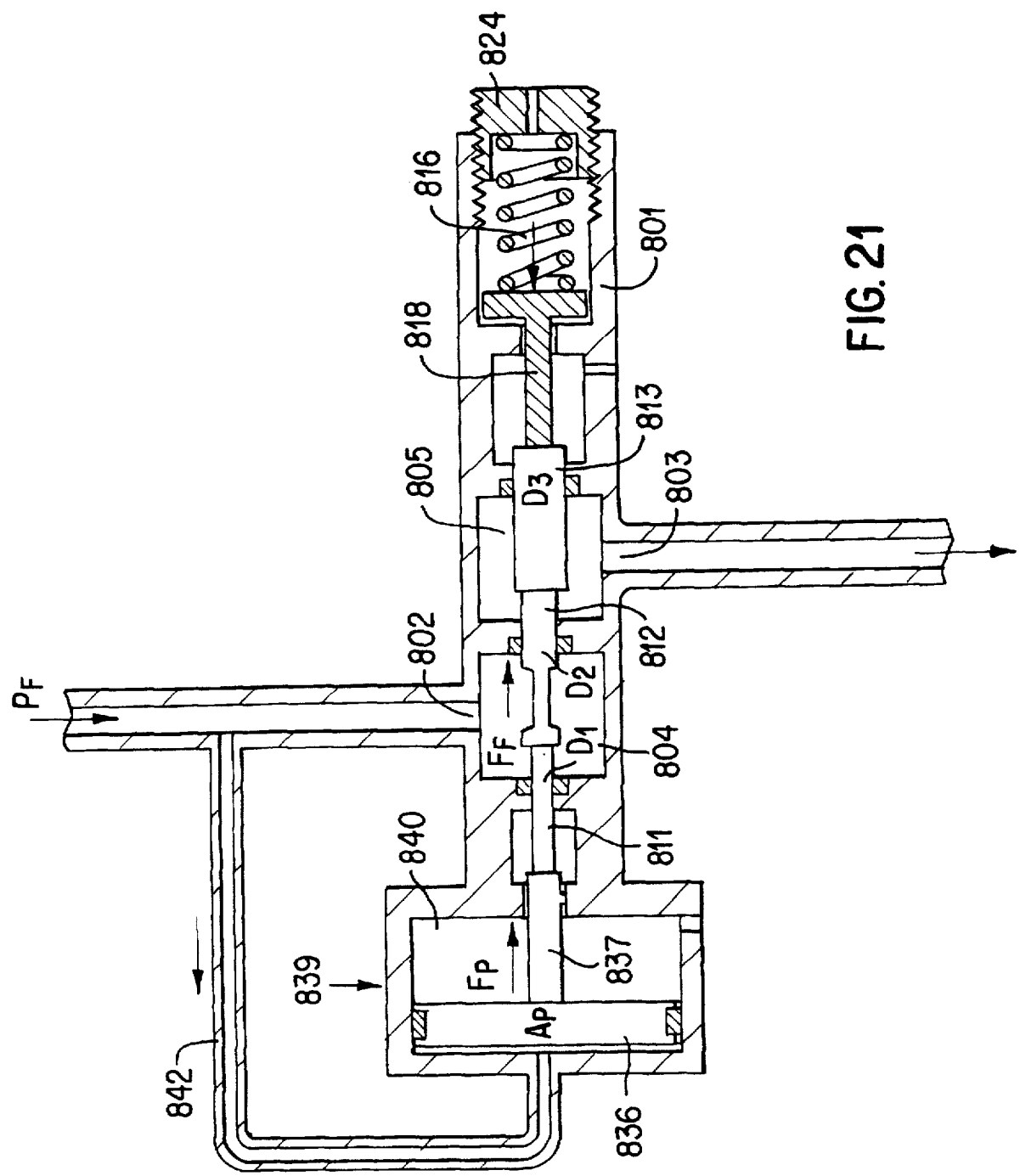
FIG. 21 shows a partial cross-sectional front view of a valve, in a closed position, according to another preferred embodiment of this invention.

FIG. 21 shows a bypass valve according to another preferred embodiment of this invention, which operates very effectively in relatively low pressure systems. Force amplifier 839 is preferably positioned at an end portion of valve body 801, generally opposite the end of valve body 801 which preferably houses closure spring 816. Force amplifier 839 is basically an actuator which converts fluidic pressure to a linear force with piston 836 and piston rod 837 positioned within cavity 840. As shown in FIG. 21, fluidic pressure acts on valve stem 808 in chamber 804, and the same fluidic pressure delivered through amplification line 842 can exert force on a surface of piston 836. An opposite surface of piston 836 preferably abuts piston rod 837, which in turn preferably abuts valve stem portion 811. Piston 836 has cross-sectional area $A_P$. The force $F_P$ generated by force amplifier 839 is the product of fluid pressure $P_F$ and cross-sectional area $A_P$, as illustrated in the following formula:

$$F_P = P_F \times A_P.$$

Thus, amplification force $F_P$ and fluid-induced force $F_F$ act upon closure spring 816 according to the following formula:

$$F_P + F_F = F_S.$$

Thus, due to force amplifier 839, closure spring 816 can have a significant bias force $F_S$ and still be used in very low pressure systems to assure authoritative opening and closing of bypass nozzle 825, even when valve stem 808 is relatively small. Without force amplifier 839, drastic diameter variations in valve stem 808 are necessary to generate fluid-induced force $F_F$ of sufficient magnitude for the valve to function. If valve body 801 is relatively small, such drastic diameter variations may not be possible. The size of force amplifier 839 can be sized and designed according to the various diameters of valve stem 808 and the system pressure levels and variations.

Figure 22:
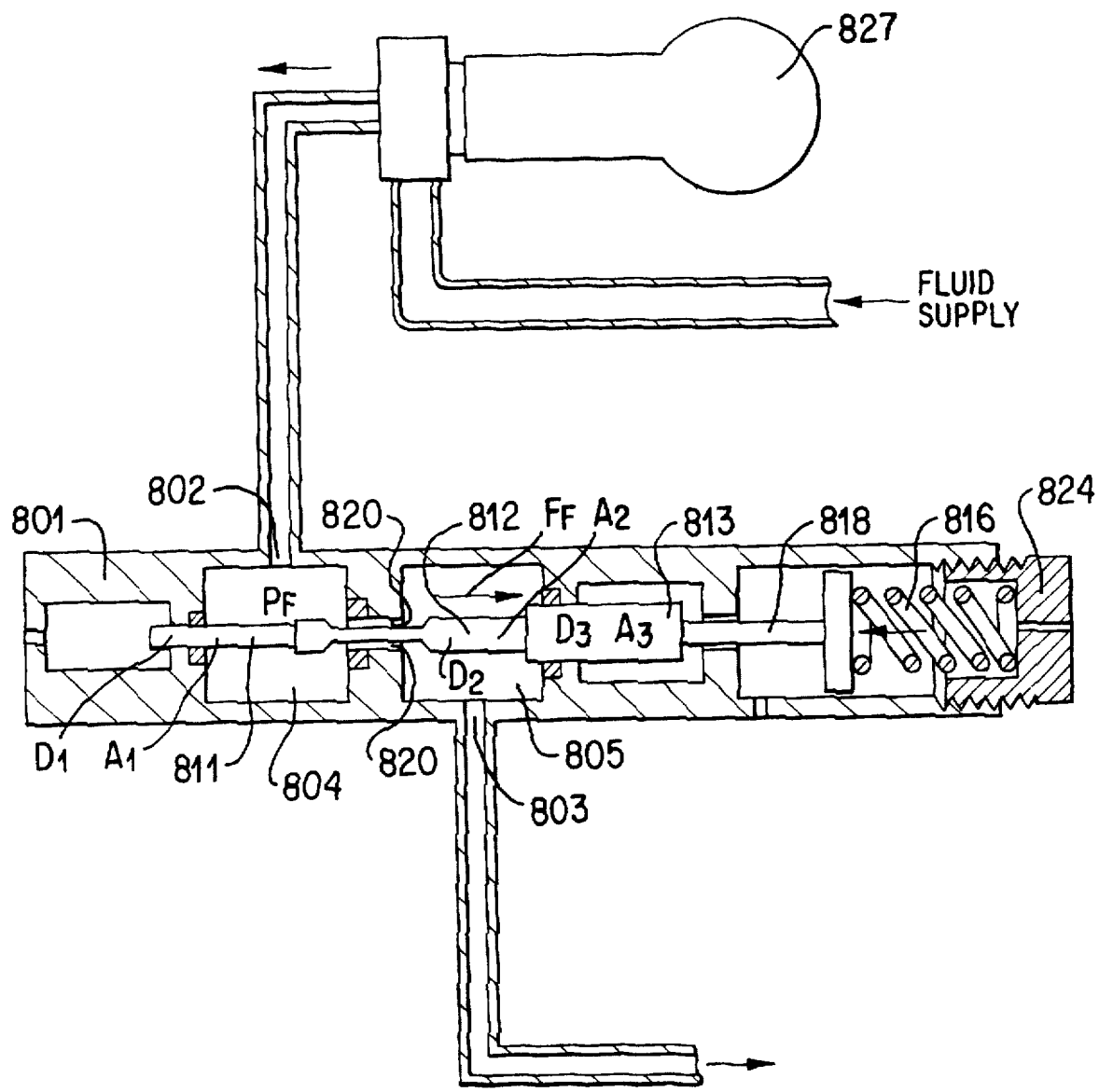
FIG. 22 shows a diagrammatic view of a fluidic system and a partial cross-sectional front view of a valve, in an open position, according to another preferred embodiment of this invention.

The valve shown in FIG. 19 can also be used in a fluid system as a lost-pressure protection valve. A lost-pressure protection valve is invaluable in hazardous fluid systems for avoiding fluid damage caused by line breaks or component failures. When used as a lost-pressure protection valve, the valve according to one preferred embodiment of this invention can be installed inline, directly in the fluid system. Referring to FIG. 22, the system fluid flows through the valve at system pressure $P_F$, and is positioned in a system fluid line between pump 827 and system components or tools located downstream of the valve. Valve stem portions 811, 812, and 813 have diameters $D_1$, $D_2$, and $D_3$ and cross-sectional areas $A_1$, $A_2$, and $A_3$, respectively. The fluid-induced force $F_F$ acting on valve stem 808 is $F_F=P_F(A_3-A_1)$. The bias force $F_S$ of closure spring 816 is preferably set to approximately equal the fluid-induced force $F_F$ so that valve stem 808 opens at a given fluid pressure $P_F$. Such calculation excludes the frictional forces of stem seals 807, 809, and 810. A drop in fluid pressure $P_F$ reduces fluid-induced force $F_F$. As bias force $F_S$ becomes greater than fluid-induced force $F_F$, closure spring 816 urges valve stem 808 into a closed position, closing valve port 820. As valve port 820 closes, fluid-induced force $F_F$ is further reduced because $F_F=P_F(A_2-A_1)$ and because $A_2<A_3$, assuring closure of valve port 820. The valve will not reopen even after fluidic pressure is restored, and the valve must be reset by moving valve stem 808 such that the fluid pressure is exposed to valve stem portion 813. Valve stem 808 can stay in an open position unless fluid pressure drops again. The valve shown in FIG. 22 is advantageously suited for high-pressure applications, such as waterjetting at pressures up to approximately 40,000 psi. A conventional closure spring 816 can be used in loss-pressure protection valves according to this invention with a very broad range of fluid pressures.

Figure 23:
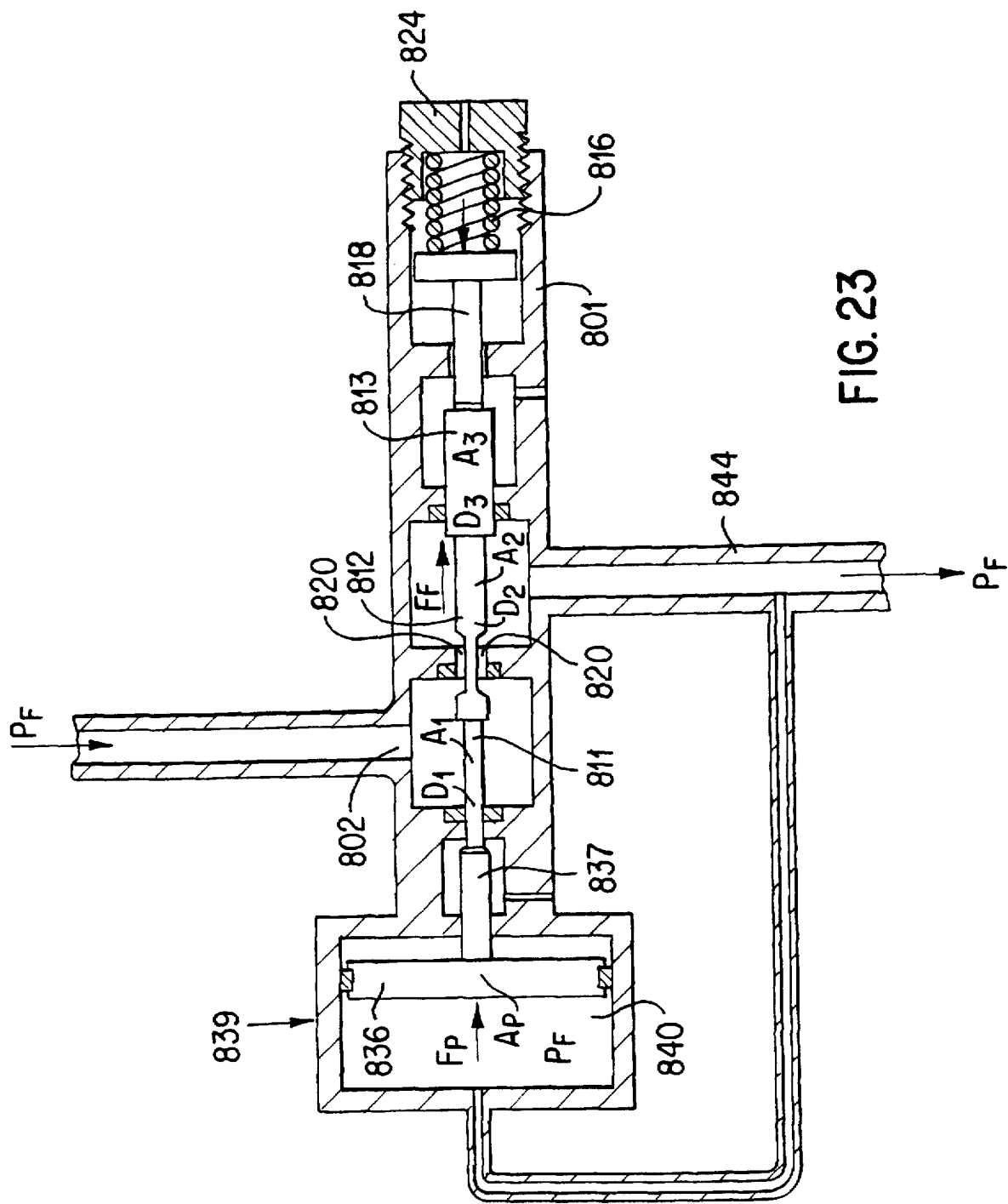
FIG. 23 shows a partial cross-sectional front view of a valve, in an open position, according to yet another preferred embodiment of this invention.

FIG. 23 shows another lost-pressure protection valve according to this invention, that can be used in relatively low-pressure fluid systems. Force amplifier 839 is preferably in fluidic communication with line 844, downstream of fluid outlet 803. The bias force $F_S$ of closure spring 816 is preferably set to approximately equal the sum of the amplification force $F_P$ and the fluid-induced force $F_F$, according to the equation shown below.

$$F_S=F_P+F_F=P_PA_P+P_F(A_3-A_1)=P_F(A_P+A_3-A_1)$$

If system pressure $P_F$ drops, amplification force $F_P$ will drop accordingly and as bias force $F_S$ becomes greater than the sum of amplification force $F_P$ and fluid-induced force $F_F$, closure spring 816 urges valve stem 808 into a closed position. Even after system pressure is restored, valve port 820 remains closed until piston 836 and piston rod 837 force valve stem 808 into an open position. Force amplifier 839 enables the lost-pressure protection valve shown in FIG. 23 to function, even at pressures less than approximately 1.0 psi. Such relatively low pressures are found in low-pressure natural gas or propane service systems. In such low-pressure systems, fluid-induced force $F_F$ acting on valve stem 808 is so low that closure spring 816 will not function properly without force amplifier 839. Force amplifier 839 allows a ten-fold increase of bias force $F_S$ to assure reliable movement of valve stem 808.

Figure 24:
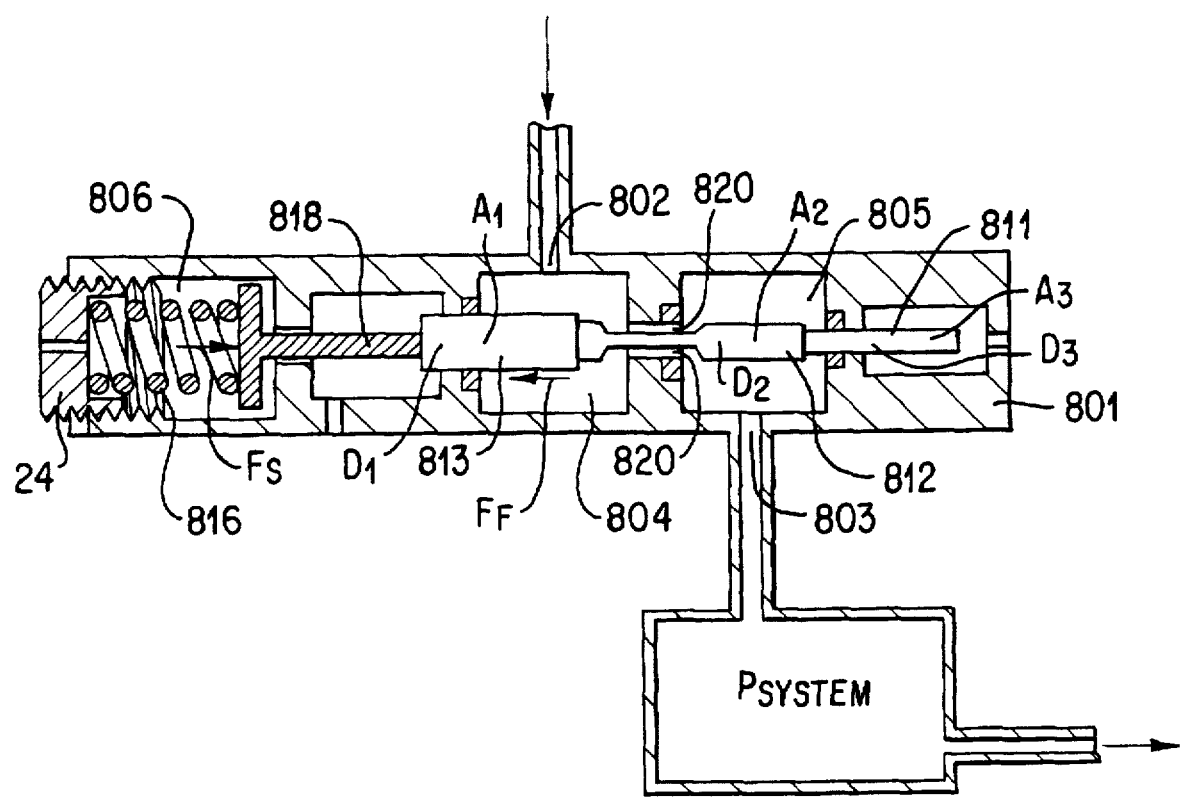
FIG. 24 shows a partial cross-sectional front view of a valve, in an open position, according to another preferred embodiment of this invention.

FIG. 24 shows a normally-open, pressure-increase-to-close valve according to another preferred embodiment of this invention, such as for maintaining a constant fluid pressure in a fluid system by regulating a source. In contrast to valve stem 808 as shown in FIGS. 5–9, stem portion 813 has diameter $D_1$ and cross-sectional area $A_1$, stem portion 812 has diameter $D_2$ and cross-sectional area $A_2$, and stem portion 811 has diameter $D_3$ and cross-sectional area $A_3$. Thus, $D_1>D_2>D_3$, and $A_1>A_2>A_3$. A portion of stem portion 813 is positioned in upstream chamber 804, and a portion of stem portion 811 is positioned in downstream chamber 805. With no fluid pressure in chamber 804, closure spring 816 acts on rod 818 to urge valve stem 808 into an open position, as shown in FIG. 24. In an open position, bias force $F_S$ equals fluid-induced force $F_F$, according to the following equation:

$$F_S=F_F=P_F(A_1-A_3).$$

If fluid system pressure $P_{system}$ increases due to flow blockage, fluid-induced force $F_F$ acting on valve stem 808 in chamber 804 will rise and urge valve stem 808 into a closed position. When the flow blockage is eliminated and fluid system pressure $P_{system}$ is reduced, closure spring 816 will urge valve stem 808 into an open position.

A pressure regulating valve can be constructed from the valve shown in FIG. 24 by setting the valve in a normally closed position so that valve port 820 will open when fluid system pressure downstream from the valve is reduced. Such a valve is essentially a pressure regulator capable of maintaining constant system pressure by regulating the fluid inlet pressure. Valve stem 808 can shuttle back and forth to open and close valve port 820, such as by countering bias force $F_S$ of closure spring 816 with fluid-induced force $F_F$ acting on valve stem 808. It is apparent that regulating valves according to this invention can be used in a wide range of fluid pressures without deviating from the basic design of the valve.

Figure 25:
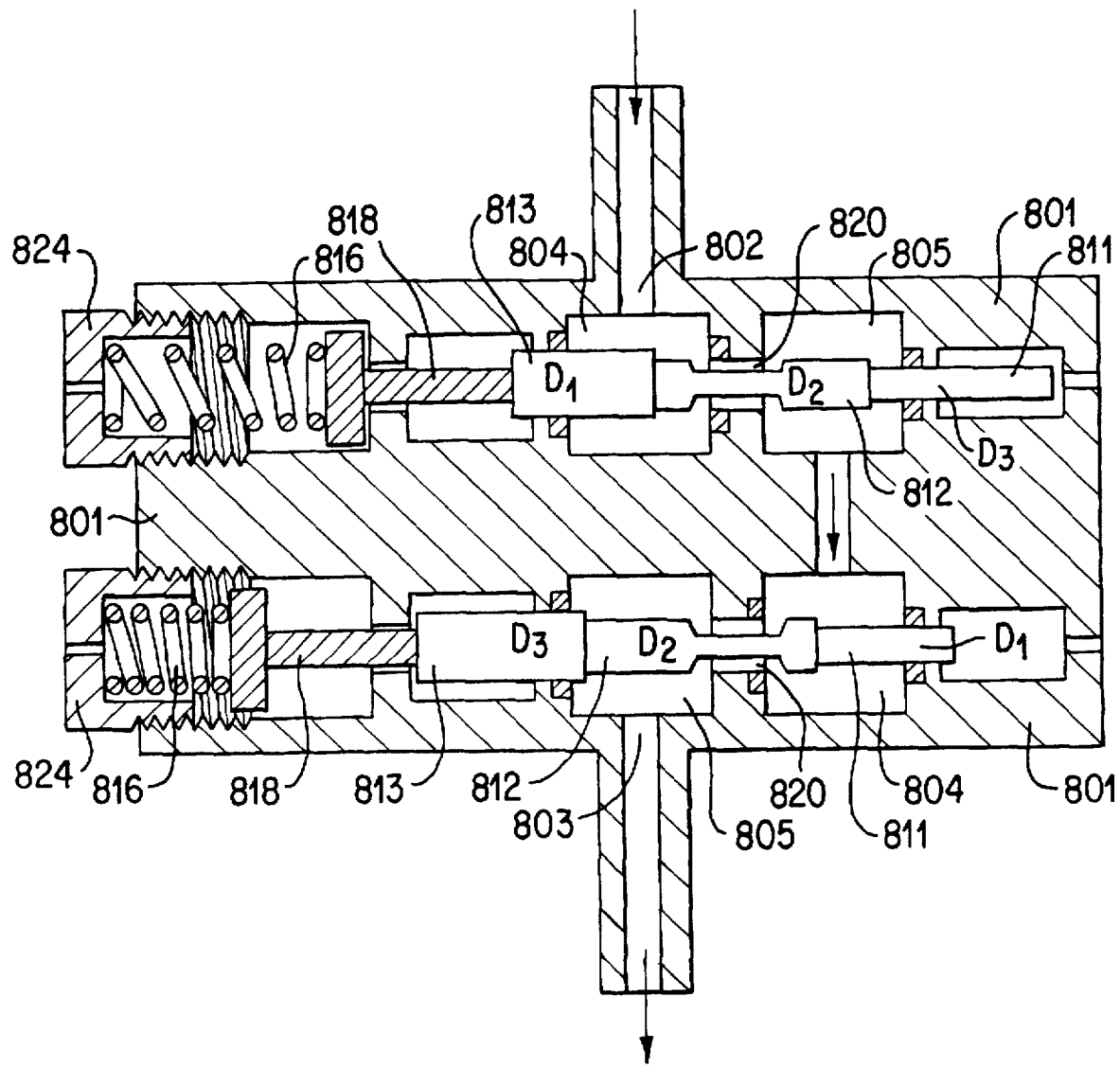
FIG. 25 shows a partial cross-sectional front view of a valve, in an open position, according to another preferred embodiment of this invention.

FIG. 25 shows a multiple-function valve according to another preferred embodiment of this invention. The valve is essentially two valves, in a single valve body 801, in fluid communication with each other. The valve functions as an automatic shut-off valve for both over-pressure and lost-pressure protection of a fluid system, and can be advantageously used in systems such as natural-gas service piping systems. The valve will automatically halt the flow of gas to a consumer's home if a system pressure regulator fails or if service piping inside the home ruptures. As shown in FIG. 25, valve body 801 preferably has two generally parallel cylindrical cavities. The upper cavity comprises an over-pressure shut-off valve portion, and the lower cavity comprises a lost-pressure protection valve portion. The two valve portions are in fluidic communication with each other. Each valve portion is set to a normally-open position and fluid flows through the valve at a given pressure. If fluidic pressure increases, the over-pressure shut-off valve portion halts fluidic flow, and if fluidic pressure decreases, the lost-pressure protection valve portion stops fluidic flow. It is apparent that the orientation of the two valve portions could be reversed, for example the lost-pressure protection valve portion could be upstream with respect to the over-pressure shut-off valve portion.

Figure 26:
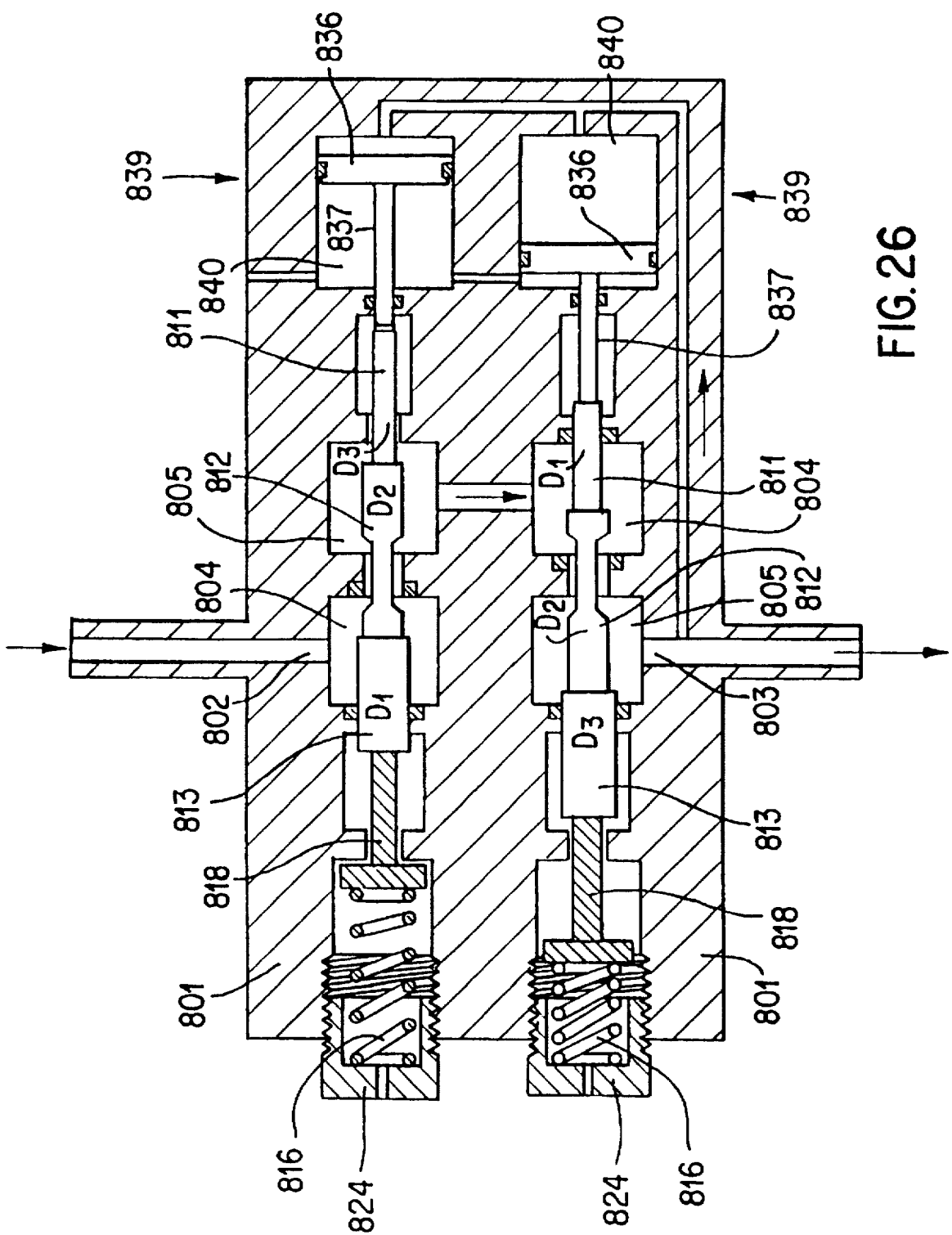
FIG. 26 shows a partial cross-sectional front view of a valve, in an open position, according to another preferred embodiment of this invention.

Sensitivity of the multiple-function automatic shut-off valve shown in FIG. 25 can be significantly increased by incorporating force amplifiers 839, as shown in FIG. 26. More robust closure springs 816 can be used with force amplifiers 839 in relatively low-pressure systems, such as natural gas and propane service piping systems. The valve shown in FIG. 26 can perform several functions. For example, upstream valve 846 can serve as a pressure regulator to reduce fluidic pressure to a lower level before such fluid enters downstream valve 847. Downstream valve 847 can serve as a lost-pressure protection valve. The multiple-function valve shown in FIG. 26 operates very well in medium-pressure natural gas distribution systems. Three functions the valve can provide are: (1) pressure regulation to reduce medium gas pressure (for example, about 30 psi) to a significantly lower pressure (for example, about 10 inches water column); (2) over-pressure protection for a gas main pressure surge due to upstream abnormalities; and (3) lost-pressure protection for a downstream line rupture.

It is apparent that the valve according to this invention can be used to construct integral valves having many functions. Conventional valves do not provide such flexibility.

Figure 27:
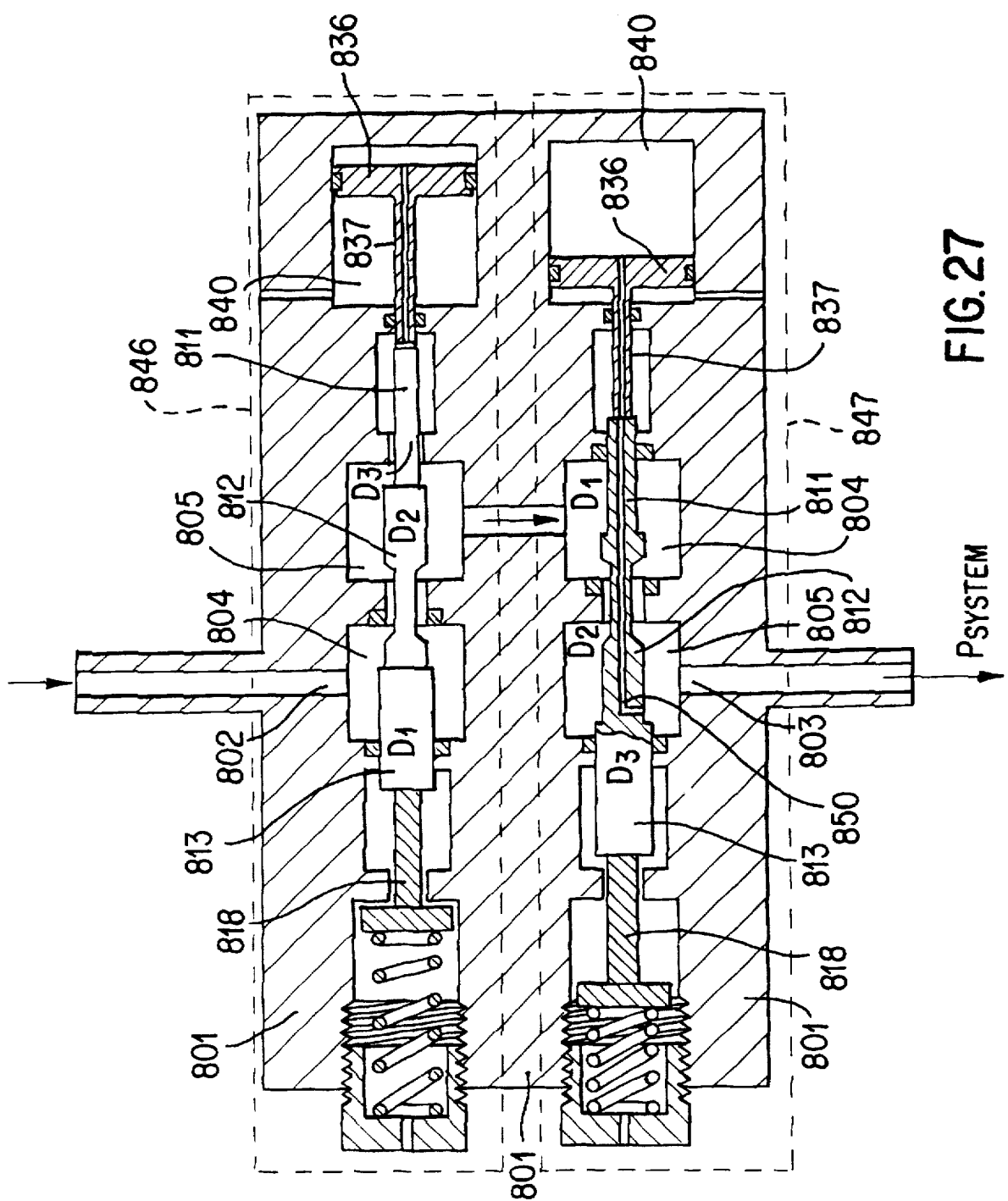
FIG. 27 shows a partial cross-sectional front view of a valve, in an open position, according to another preferred embodiment of this invention.

FIG. 27 shows a valve according to another preferred embodiment of this invention. Valve stem 808 has bleed passage 850. Bleed passage 850 allows fluidic pressures to be better manipulated to serve valving operations, and can eliminate or minimize separate fluid passages through valve body 801, thereby reducing valve fabrication costs.

EXAMPLE I

A bypass valve according to one preferred embodiment of this invention, as shown in FIG. 19, was designed and constructed for a maximum water pressure of about 45,000 psi. Valve stem 808 was 3.2 inches in length and diameter $D_1$ of stem portion 811 was 0.166 inches, diameter $D_2$ of stem portion 812 was 0.187 inches, and diameter $D_3$ of stem portion 813 was 0.195 inches. Valve stem 808 was constructed of hardened steel and had well-polished surfaces. Cross-sectional area $A_1$ of stem portion 811 was 0.0216 square inches, cross-sectional area $A_2$ of stem portion 812 was 0.0275 square inches, and cross-sectional area $A_3$ of stem portion 813 was 0.0297 square inches. Closure spring 816 was 0.750 inches in diameter and 1.500 inches in length. Three closure springs 816, each having a different stiffness, were used in testing to show the versatility of the valve according to this invention. The first closure spring 816, which will be referred to as spring A, was the softest of the three springs and had a spring rate of 77 $lb_f$ per inch of compression. With spring A positioned in cavity 806, the valve opened at 6,000 psi water pressure and closed at 5,000 psi water pressure. A second closure spring 816, referred to as spring B, had a spring rate of 200 $lb_f$ per inch. With spring B positioned in cavity 806, the valve opened at 20,000 psi water pressure and closed at 10,000 psi water pressure. A third closure spring 816, which will be referred to as spring C, had a spring rate of 320 $lb_f$ per inch. With spring C positioned in cavity 806, the valve opened at 30,000 psi water pressure and closed at 20,000 psi water pressure. Thus, the valve according to this invention can be set to operate in a wide range of fluid pressures by simply changing the stiffness coefficient of closure spring 816. No other changes are required if the valve is initially designed for a proper maximum fluidic pressure.

A bypass valve according to this invention was installed in a waterjetting system similar to the waterjetting system shown in FIG. 19. Waterjetting nozzle 831 had a 0.050 inch diameter orifice. Bypass nozzle 825 also had a 0.050 inch diameter orifice. The system was set to operate at a water pressure of 20,000 psi with on-off valve 830 open and the valve closed. Spring B was used as closure spring 816. The valve opened promptly when on-off valve 830 was closed. The pressure within pump outlet line 828 briefly increased to above 20,000 psi but returned to 20,000 psi after the valve opened. When on-off valve 830 opened, the pressure within pump outlet line 828 briefly dropped significantly but quickly returned to 20,000 psi when the valve closed. The valve functioned automatically and repeatedly with repeated operations of on-off valve 830.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. A valve comprising:
    a valve body having a fluid inlet, a primary valve stem, a first chamber, a first throughbore, a first intermediate chamber, a secondary valve stem, a second intermediate chamber, a second throughbore, a second chamber and a fluid outlet;
    in an open position of the valve said fluid inlet, said first chamber, said first throughbore, said first intermediate chamber, said secondary intermediate chamber, said second throughbore, said second chamber and said fluid outlet in communication with each other;
    said primary valve stem and said secondary valve stem slidably mounted with respect to said valve body;
    in a closed position of the valve a first primary portion of said primary valve stem and a second primary portion of said primary valve stem exposed to a first pressure condition within said first chamber, a first secondary portion of said secondary valve stem and a second secondary portion of said secondary valve stem exposed to a second pressure condition within said second chamber, in said closed position of said valve one of said second primary portion and said second secondary portion sealably positioned within one of said first throughbore and said second throughbore, a first diameter of said first primary portion sized differently than a second diameter of said second primary portion, a first diameter of said first secondary portion sized differently than a second diameter of said second secondary portion; and
    bias means for urging at least one of said primary valve stem and said secondary valve stem in an axial direction toward one of said open position and said closed position.

2. A valve according to claim 1 wherein said primary valve stem has a fluid passage and in said open position said fluid passage is in communication with said first chamber and said first intermediate chamber.

3. A valve according to claim 2 wherein in said open position said primary valve stem is positioned so that said fluid passage is at least partially within said first throughbore.

4. A valve according to claim 1 wherein said valve body slidably supports said primary valve stem at two areas of said primary valve stem which are spaced apart from each other.

5. A valve according to claim 1 further comprising:
    a third primary portion of said primary valve stem exposed to a second pressure condition within said first intermediate chamber, and a third diameter of said third primary portion sized differently than said second diameter of said second primary portion.

6. A valve according to claim 1 wherein said bias means comprise:
    a push rod, said push rod having one end abutting one of said primary valve stem and said secondary valve stem, a spring, and said spring urging an opposite end of said push rod.

7. A valve according to claim 6 further comprising adjustment means for adjusting a bias force of said spring.

8. A valve according to claim 7 wherein said adjustment means comprise:
    said valve body having a cylindrical cavity, said spring positioned within said cylindrical cavity, a plug adjustably mounted with respect to said valve body, and said spring contacting said plug.

9. A valve according to claim 1 further comprising force supplement means for increasing an opening force applied to said valve stem.

10. A valve according to claim 9 wherein said force supplement means comprise:

a rod slidably mounted with respect to said valve body, and actuation means for urging said rod against one of said primary valve stem and said secondary valve stem in one of an opening and a closing direction.

11. A valve according to claim 10 wherein said actuation means comprise:

a piston slidably and sealably mounted within a cylinder, and pressure means for driving said piston.

12. A valve according to claim 11 wherein said pressure means comprise: a high-pressure side of said cylinder in communication with said fluid inlet.

13. A valve according to claim 11 wherein said pressure means comprise: a high-pressure side of said cylinder in communication with said fluid outlet.

14. A valve according to claim 1 wherein said secondary valve stem has a fluid passage and in said open position said fluid passage is in communication with said second chamber and said second intermediate chamber.

15. A valve according to claim 14 wherein in said open position said secondary valve stem is positioned so that said fluid passage is at least partially within said second throughbore.

16. A valve according to claim 1 wherein said valve body slidably supports said secondary valve stem at two areas of said secondary valve stem which are spaced apart from each other.

* * * * *